(12) United States Patent
Tashiro

(10) Patent No.: US 10,042,144 B2
(45) Date of Patent: Aug. 7, 2018

(54) IMAGE PICKUP APPARATUS

(71) Applicant: CANON KABUSHIKI KAISHA, Tokyo (JP)

(72) Inventor: Yoshihisa Tashiro, Nikko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/483,676

(22) Filed: Apr. 10, 2017

(65) Prior Publication Data

US 2017/0293120 A1    Oct. 12, 2017

(30) Foreign Application Priority Data

Apr. 12, 2016 (JP) ................. 2016-079394

(51) Int. Cl.

| | |
|---|---|
| *G02B 15/14* | (2006.01) |
| *G02B 9/34* | (2006.01) |
| *G02B 5/20* | (2006.01) |
| G02B 13/00 | (2006.01) |
| G02B 15/20 | (2006.01) |
| G02B 27/00 | (2006.01) |
| G02B 9/12 | (2006.01) |

(Continued)

(52) U.S. Cl.
CPC ............ *G02B 15/14* (2013.01); *G02B 5/208* (2013.01); *G02B 9/12* (2013.01); *G02B 9/34* (2013.01); *G02B 13/004* (2013.01); *G02B 13/009* (2013.01); *G02B 13/0035* (2013.01); *G02B 13/0045* (2013.01); *G02B 13/04* (2013.01); *G02B 15/177* (2013.01); *G02B 15/20* (2013.01); *G02B 27/0025* (2013.01)

(58) Field of Classification Search
CPC .... G02B 13/0035; G02B 9/12; G02B 15/177; G02B 5/208; G02B 13/04; G02B 13/009; G02B 15/20; G02B 27/0025; G02B 15/14; G02B 9/34; G02B 13/0045; G02B 13/004
USPC ........ 359/676, 683–692, 708, 713–717, 740, 359/754–795
See application file for complete search history.

(56) References Cited

U.S. PATENT DOCUMENTS 7,411,729 B2    8/2008  Iyama et al.
2005/0231816 A1*  10/2005  Obama ................. G02B 5/208
                                              359/656

(Continued)

FOREIGN PATENT DOCUMENTS

JP        2006053361 A    2/2006

*Primary Examiner* — Evelyn A Lester
(74) *Attorney, Agent, or Firm* — Rossi, Kimms & McDowell LLP

(57) ABSTRACT

In an image pickup apparatus including an optical system and an image pickup element, the optical system includes, in order from an object side to an image side, lens(es), an aperture stop, and lens(es). The lens arranged at the most image side in the optical system is a negative lens, and an infrared cut film is formed on at least one lens surface in the optical system. An optical axial distance from the exit pupil of the optical system to the image plane when focusing on an infinite object, an optical axial distance from the lens surface provided with the infrared cut film to the image plane when focusing on the infinite distance object, the curvature radius of the lens surface provided with the infrared cut film, and a radius of a circle circumscribed about an effective imaging area of the image pickup element are appropriately set.

10 Claims, 12 Drawing Sheets

(51) Int. Cl.
    *G02B 15/177* (2006.01)
    *G02B 13/04* (2006.01)

(56) References Cited

U.S. PATENT DOCUMENTS

| | | | | |
|---|---|---|---|---|
| 2006/0098300 A1* | 5/2006 | Yamamoto | ............ | G02B 15/177 359/686 |
| 2007/0058256 A1* | 3/2007 | Sun | ........................ | G02B 9/34 359/569 |
| 2010/0020409 A1* | 1/2010 | Shinohara | ............ | G02B 15/177 359/683 |
| 2010/0188556 A1* | 7/2010 | Hirao | ................. | G02B 13/0035 359/754 |

* cited by examiner

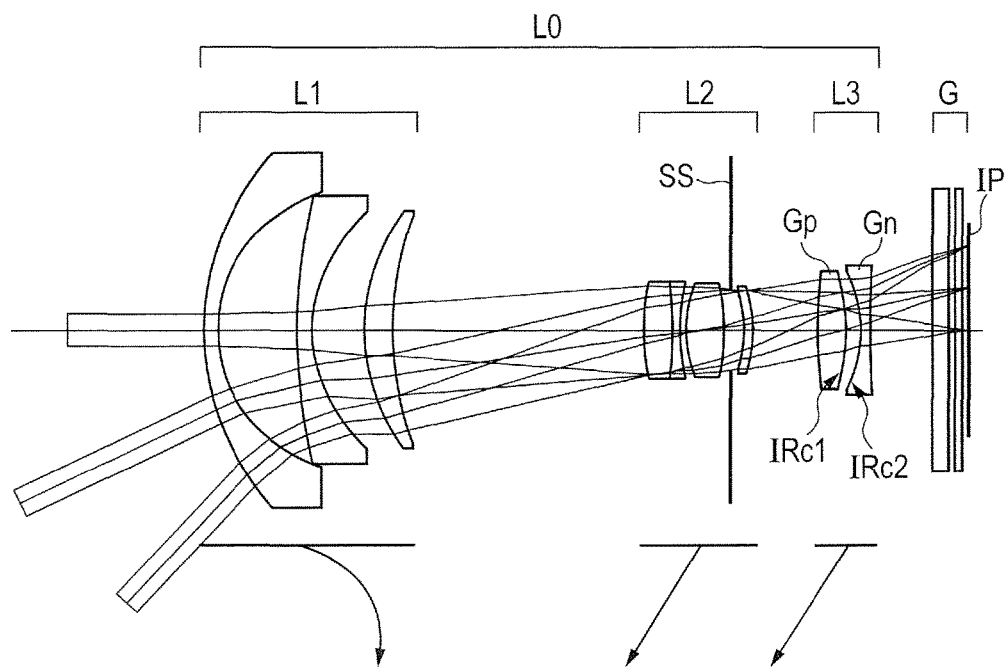
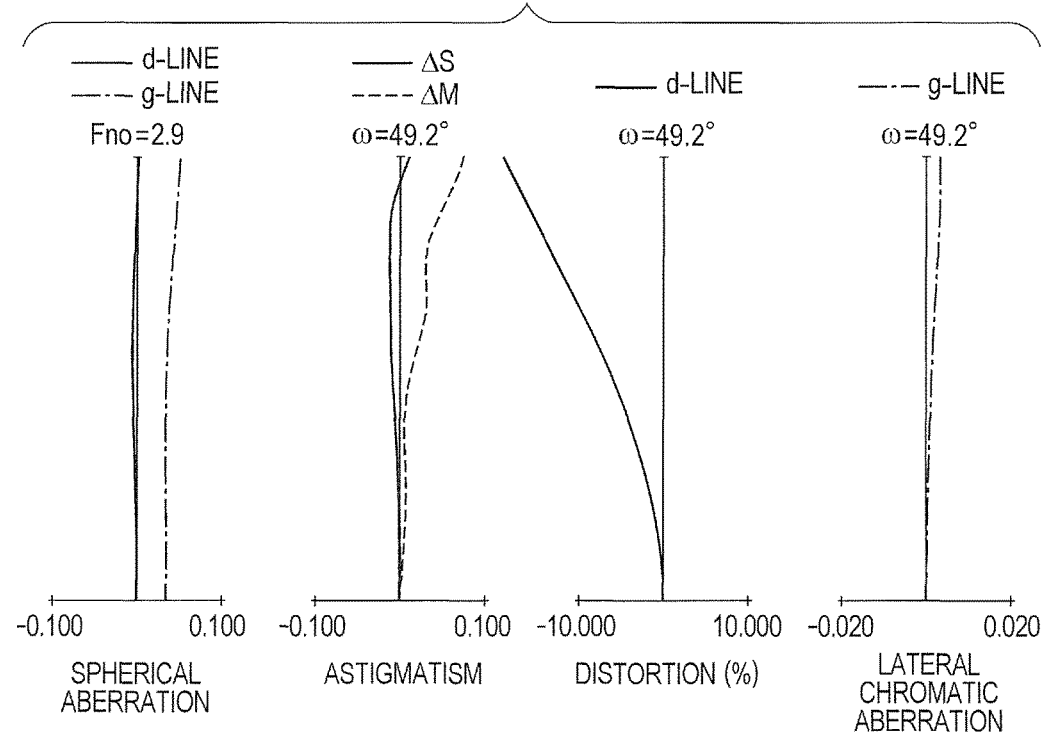

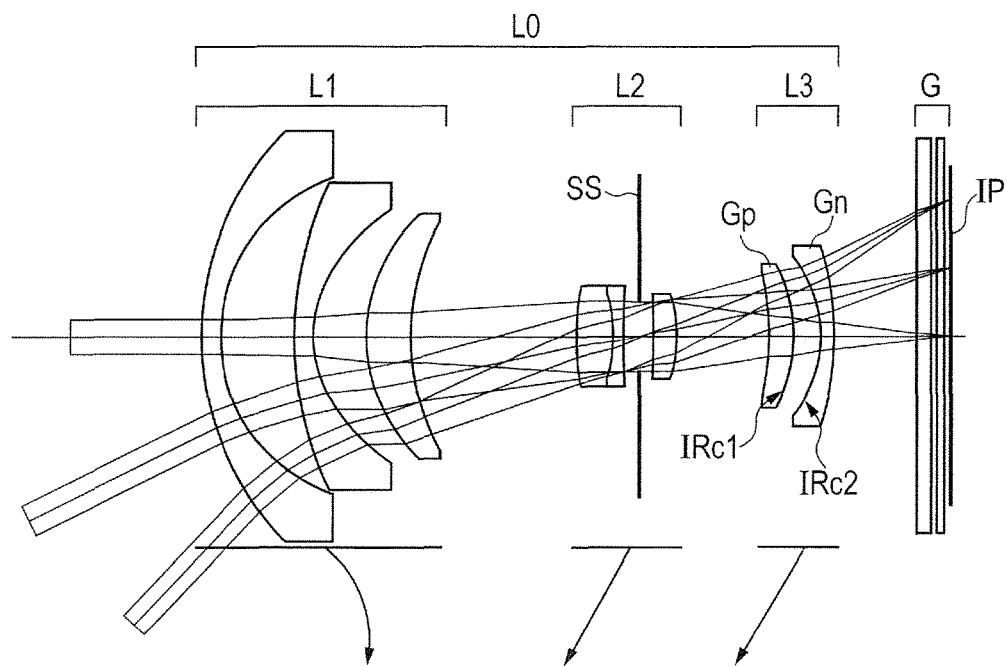
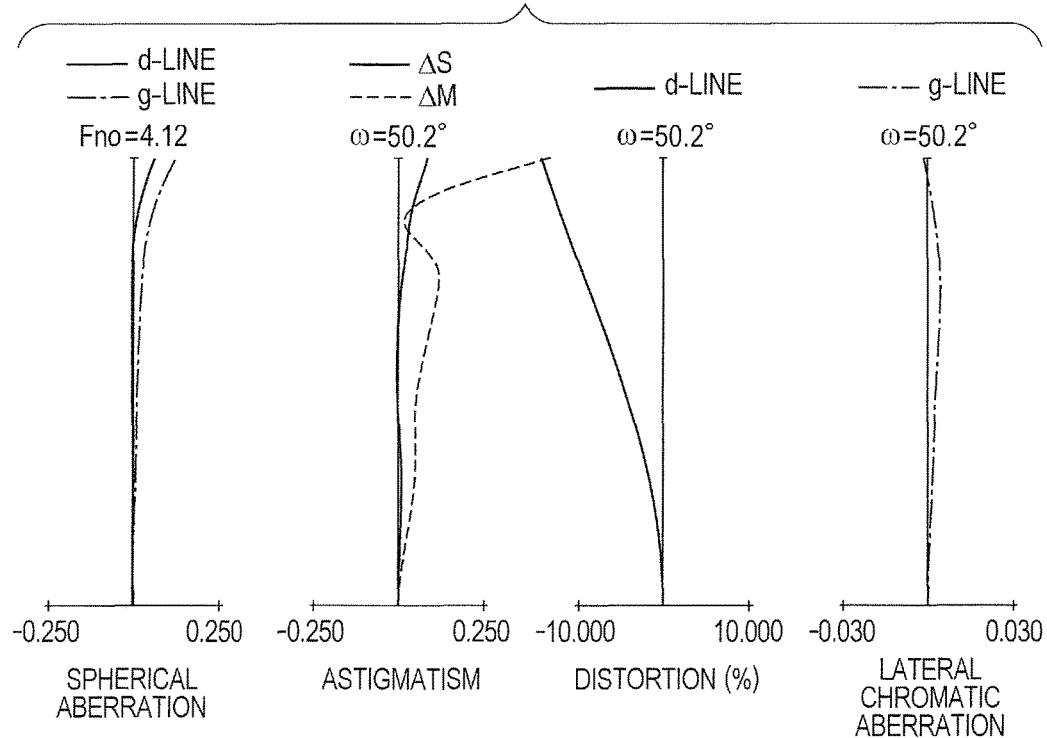

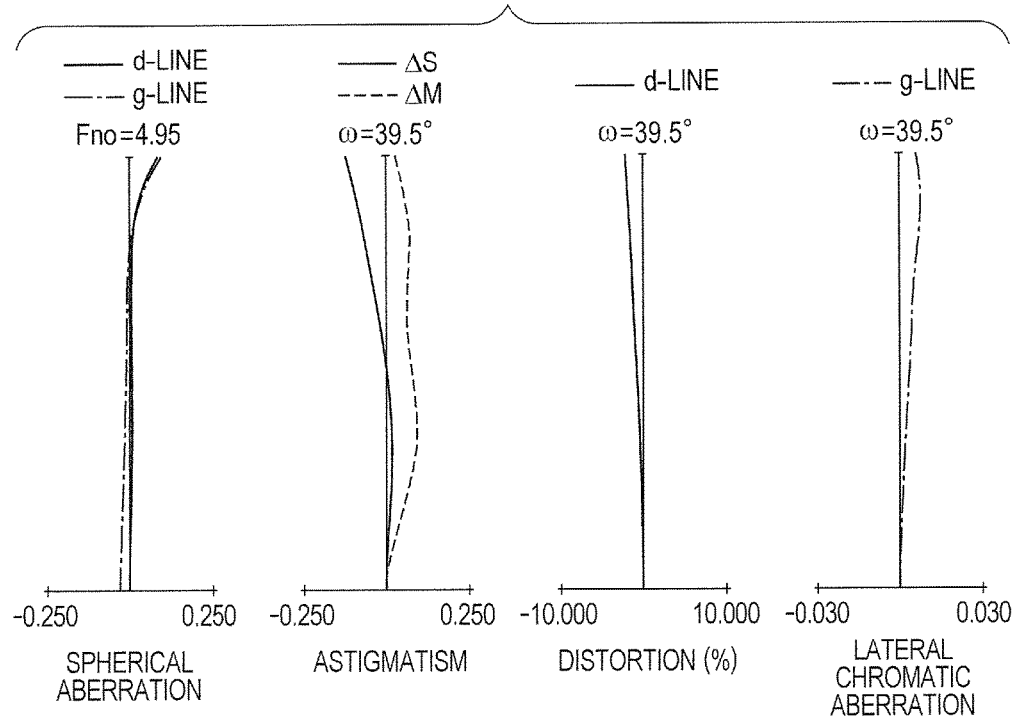
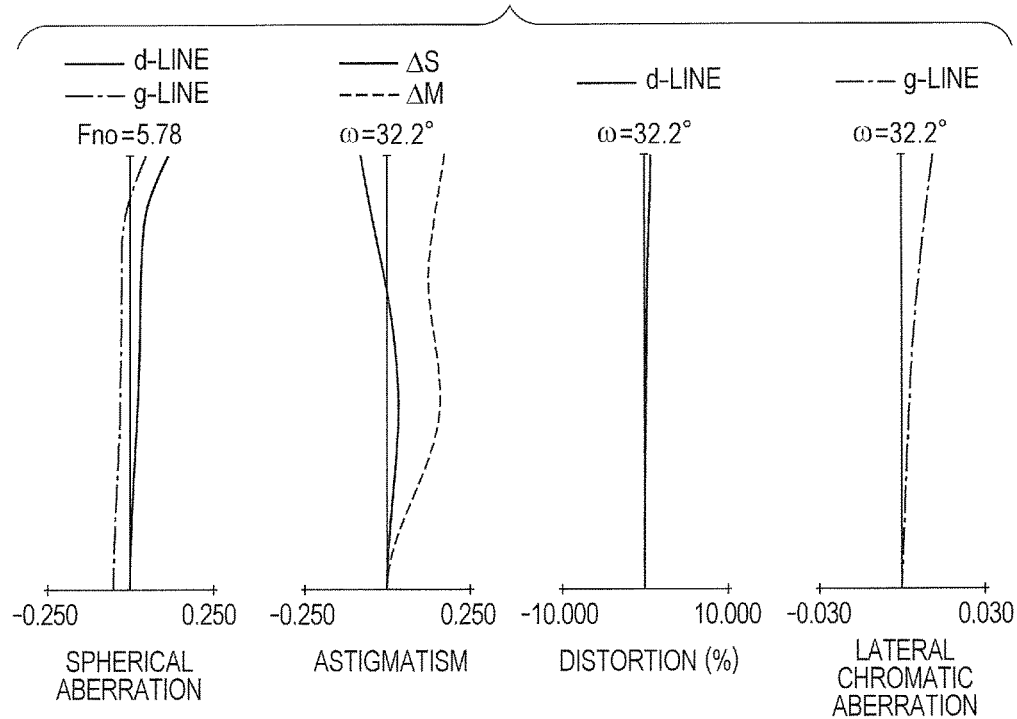

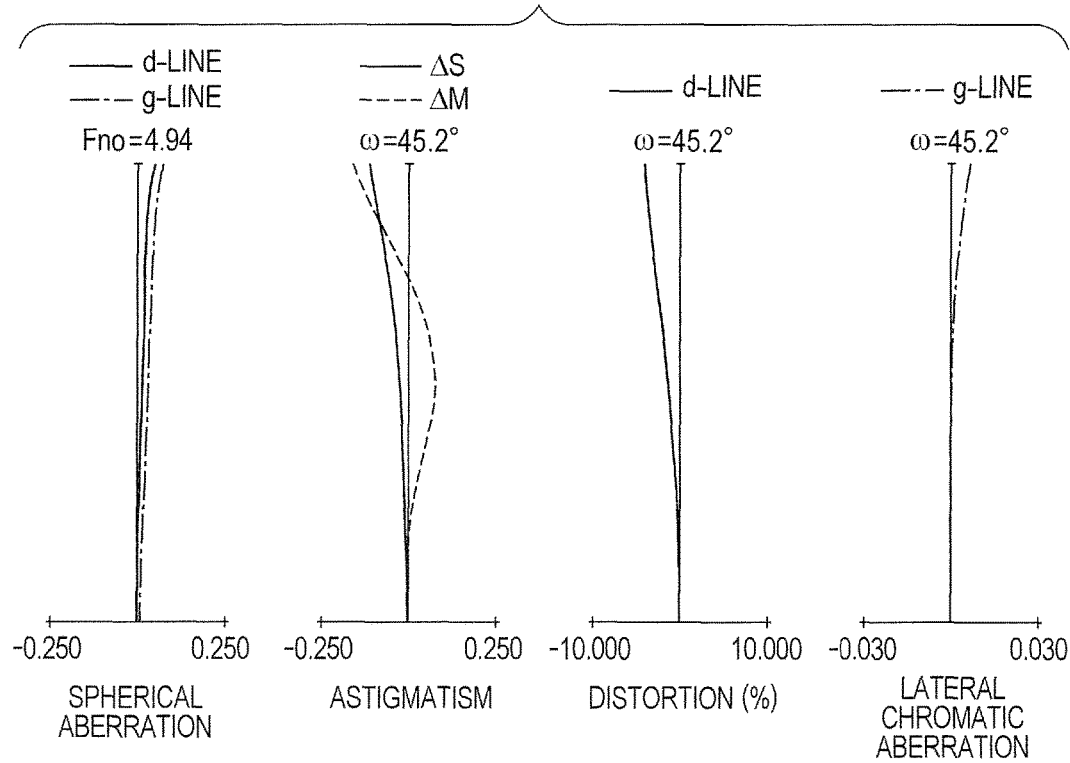
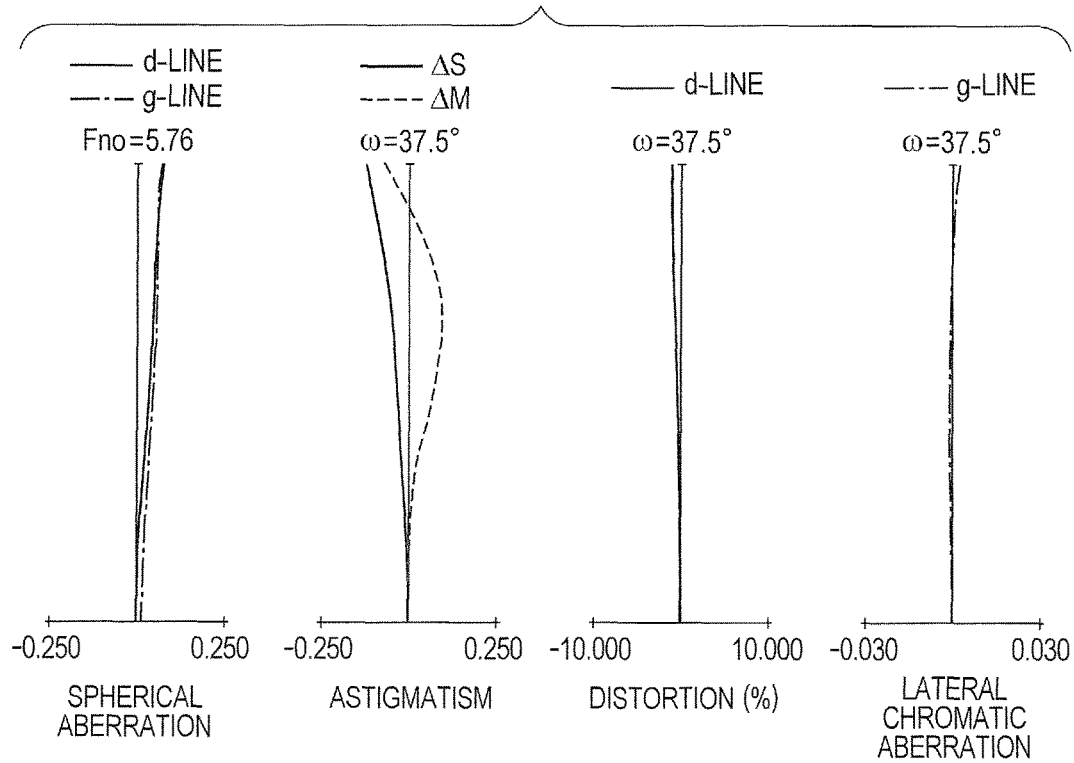

IMAGE PICKUP APPARATUS

BACKGROUND OF THE INVENTION

Field of the Invention

The present invention relates to an image pickup apparatus including an optical system. For example, the present invention relates to image pickup apparatuses such as video cameras, digital still cameras, and monitoring cameras.

Description of the Related Art

Most of image pickup elements used in image pickup apparatuses have sensitivity not only to light in a visible range (a wavelength of 380 nm to 780 nm) but also to light in an infrared range (a wavelength of 780 nm to 1000 nm). For this reason, the image pickup element lowers its optical properties if infrared unnecessary light enters the image pickup element. To prevent the infrared unnecessary light from entering the image pickup element, an absorption or reflection type of infrared cut element that cuts infrared light needs to be provided in the optical system.

In general, if the infrared cut element is provided in the optical system, the total lens length increases by an amount of the thickness of the infrared cut element. In this connection, there has been heretofore proposed a small optical system downsized by forming an infrared cut film (optical thin film) on a lens surface. U.S. Pat. No. 7,411,729 discloses an optical system in which an infrared cut film is formed on a lens surface in the optical system.

In order to downsize an optical system while using a large image pickup element, it is generally preferred to shorten a distance between the exit pupil of the optical system and the image plane. When the distance between the exit pupil of the optical system and the image plane is shortened, an incident angle of a principal ray on the image plane varies greatly from the center to the periphery of the field, which means that an incident angle of the principal ray on the lens surface provided with the infrared cut film also varies greatly.

FIG. 13 is a spectral characteristic diagram presenting transmittance characteristics of the infrared cut film specified in TABLE 2 in U.S. Pat. No. 7,411,729 in two cases where the incident angle to the optical thin film is 0 degrees (normal incidence) and 30 degrees. As is apparent from FIG. 13, an increase in the incident angle on the optical thin film causes the infrared cut-off wavelength to shift to a short wavelength side from the cut-off wavelength at the normal incidence.

Here, for example, assume that an optical filter composed of a parallel plate on which an infrared cut film is formed is used between the optical system and the image pickup element. In this case, if an optical system is reduced in total size by employing a short pupil length configuration, the infrared cut-off wavelength varies among angles of view (image heights of the image pickup element), and resultantly the image quality greatly deteriorates due to the occurrence of color shading.

The present invention has an objective to provide an image pickup apparatus in which an optical system is downsized with a short pupil length configuration and is made capable of cutting infrared light and also reducing the occurrence of color shading attributed to an oblique incidence of a ray.

SUMMARY OF THE INVENTION

An image pickup apparatus of the present invention is an image pickup apparatus including: an optical system; and an image pickup element configured to pick up an image formed by the optical system, in which the optical system includes, in order from an object side to an image side, one or more lenses, an aperture stop, and one or more lenses, the lens arranged at the most image side in the optical system is a negative lens, an infrared cut film is formed on at least one lens surface in the optical system, and the following conditional expressions are satisfied:

$$0.1 < (Lepw - Lc)/Rc < 1.5; \text{ and}$$

$$1.0 < |Lepw|/Y\max < 2.5,$$

where Lepw denotes an optical axial distance from an exit pupil of the optical system to an image plane when the optical system focuses on an infinite distance object, Lc denotes an optical axial distance from the lens surface provided with the infrared cut film to the image plane when the optical system focuses on the infinite distance object, Rc denotes a curvature radius of the lens surface provided with the infrared cut film, and Ymax denotes a radius of a circle circumscribed about an effective imaging area of the image pickup element.

Further features of the present invention will become apparent from the following description of exemplary embodiments with reference to the attached drawings.

BRIEF DESCRIPTION OF THE DRAWINGS

FIG. 1 is a lens cross sectional view of an optical system of Embodiment 1 at a wide angle end.

FIG. 2A is a longitudinal aberration diagram of the optical system of Embodiment 1 in infinity focusing at the wide angle end.

FIG. 5 is a lens cross sectional view of an optical system of Embodiment 3 at a wide angle end.

FIG. 6A is a longitudinal aberration diagram of the optical system of Embodiment 3 in infinity focusing at the wide angle end.

FIG. 6B is a longitudinal aberration diagram of the optical system of Embodiment 3 in infinity focusing at the middle zooming position.

FIG. 6C is a longitudinal aberration diagram of the optical system of Embodiment 3 in infinity focusing at the telephoto end.

FIG. 8B is a longitudinal aberration diagram of the optical system of Embodiment 4 in infinity focusing at the middle zooming position.

FIG. 8C is a longitudinal aberration diagram of the optical system of Embodiment 4 in infinity focusing at the telephoto end.

DESCRIPTION OF THE EMBODIMENTS

Hereinafter, preferred embodiments of the present invention will be described in detail in accordance with the accompanying drawings. An image pickup apparatus of the present invention includes an optical system, and an image pickup element configured to pick up an image formed by the optical system. The optical system includes, in order from an object side to an image side, one or more lenses, an aperture stop, and one or more lenses. The lens arranged at the most image side in the optical system is a negative lens. An infrared cut films is formed on at least one lens surface in the optical system.

Figure 2B:
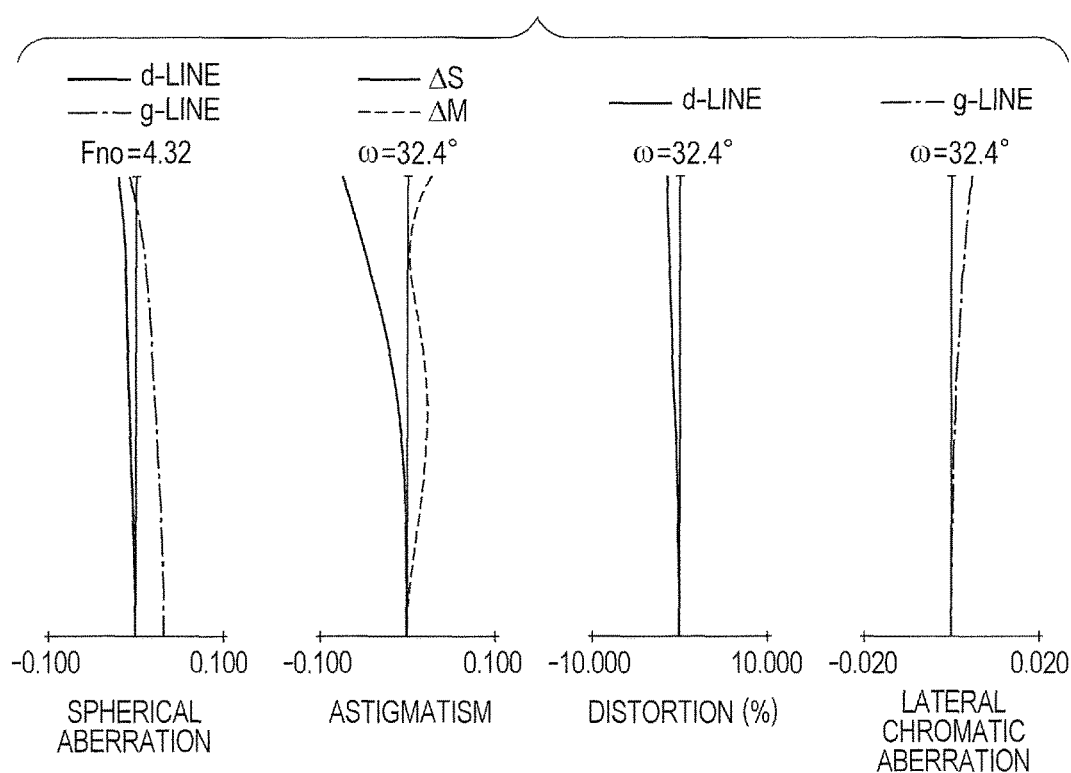
FIG. 2B is a longitudinal aberration diagram of the optical system of Embodiment 1 in infinity focusing at a middle zooming position.
Figure 2C:
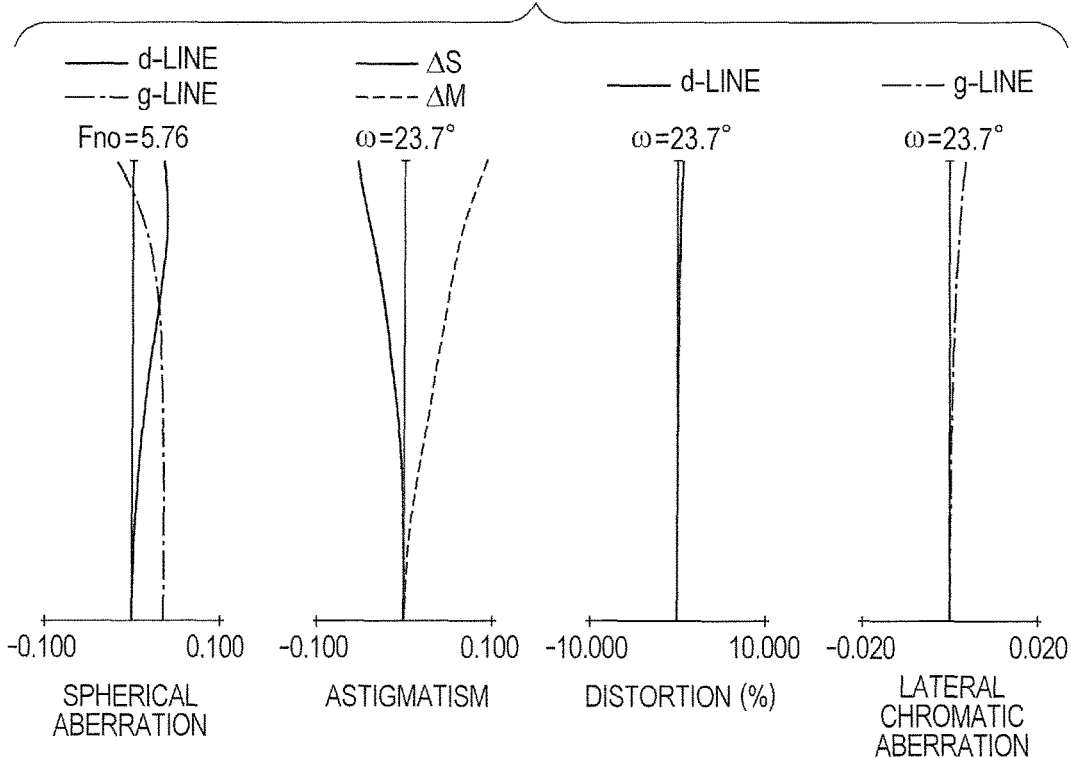
FIG. 2C is a longitudinal aberration diagram of the optical system of Embodiment 1 in infinity focusing at a telephoto end.
Figure 3:
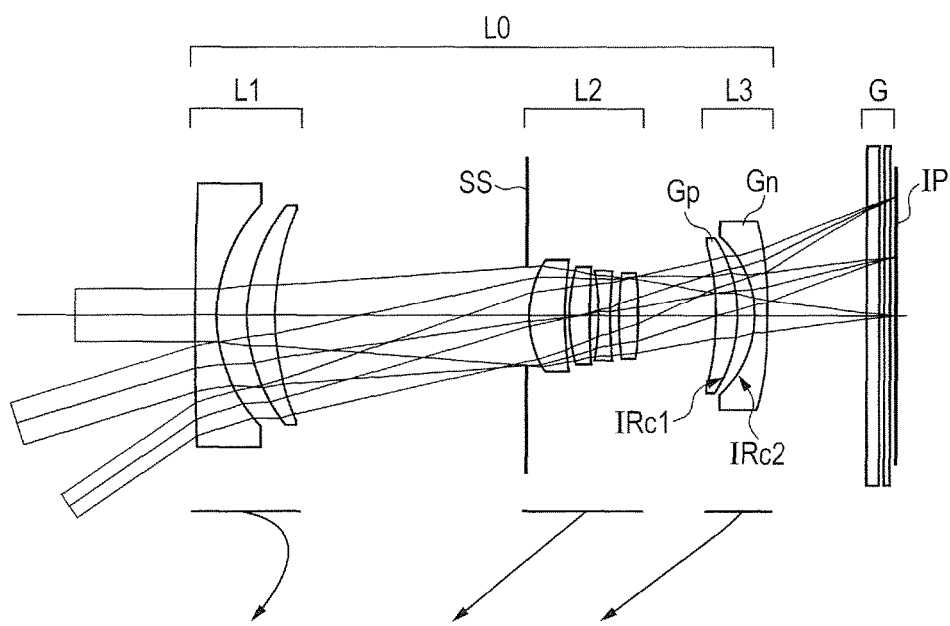
FIG. 3 is a lens cross sectional view of an optical system of Embodiment 2 at a wide angle end.
Figure 4A:
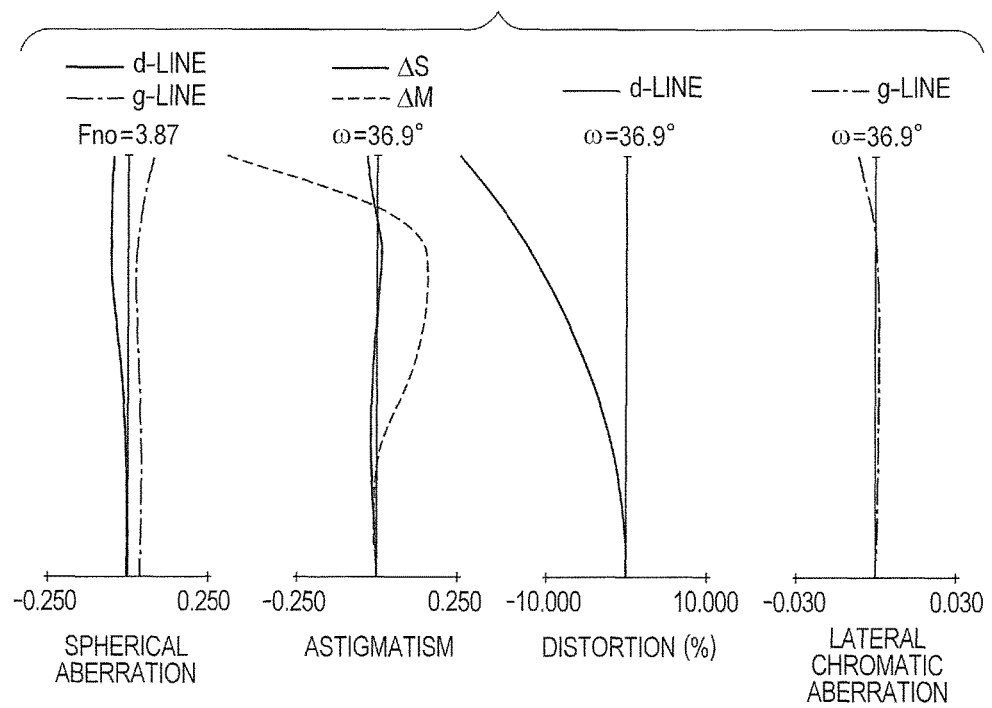
FIG. 4A is a longitudinal aberration diagram of the optical system of Embodiment 2 in infinity focusing at the wide angle end.
Figure 4B:
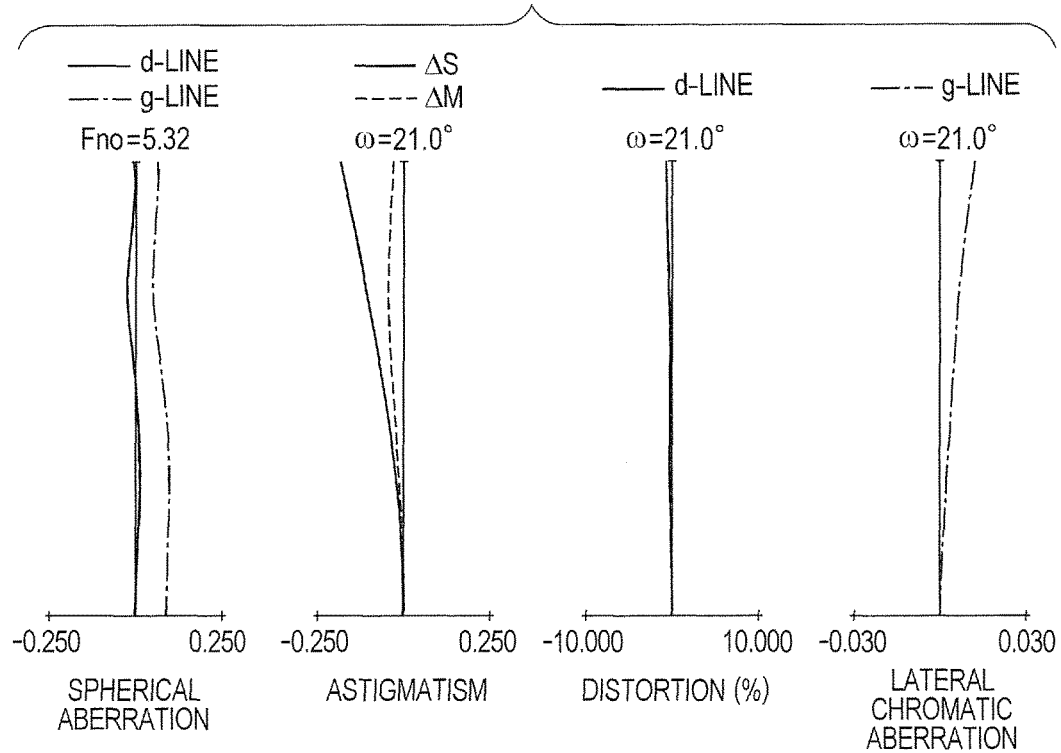
FIG. 4B is a longitudinal aberration diagram of the optical system of Embodiment 2 in infinity focusing at the middle zooming position.
Figure 4C:
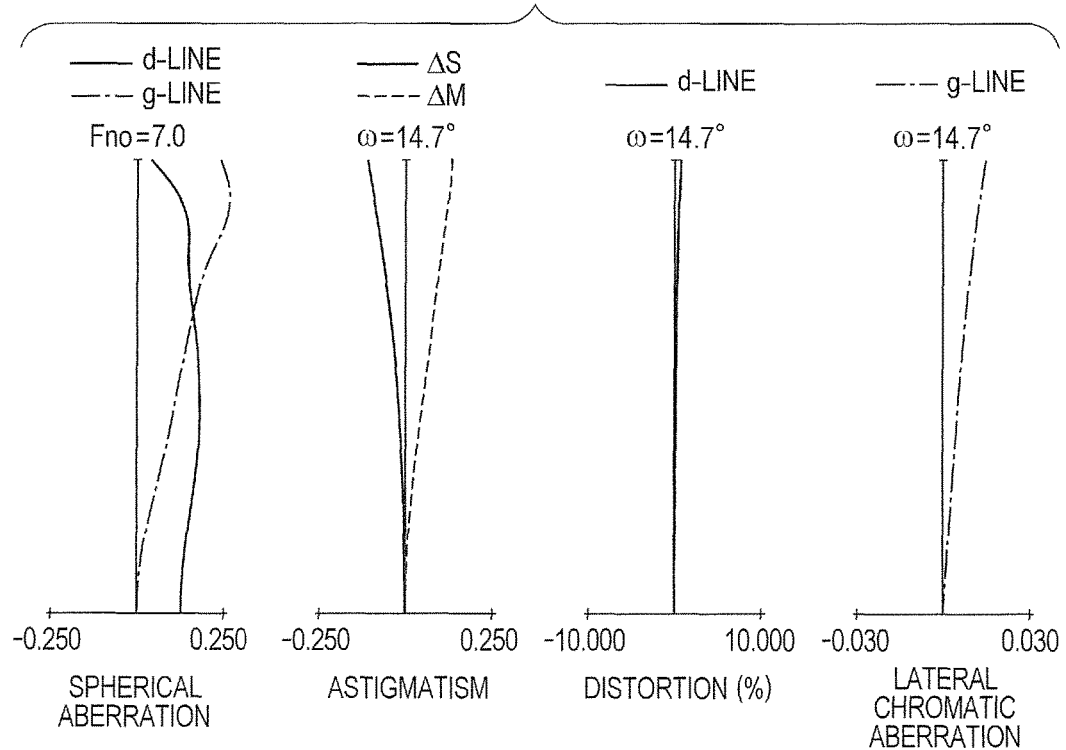
FIG. 4C is a longitudinal aberration diagram of the optical system of Embodiment 2 in infinity focusing at the telephoto end.

FIG. 1 is a lens cross sectional view of an optical system used in an image pickup apparatus at a wide angle end (short focal length end) according to Embodiment 1 of the present invention. FIGS. 2A, 2B, and 2C are longitudinal aberration diagrams in the cases where the optical system used in the image pickup apparatus according to Embodiment 1 of the present invention focuses on an infinite distance object at the wide angle end, a middle zooming position, and a telephoto end (long focal length end), respectively. FIG. 3 is a lens cross sectional view of an optical system used in an image pickup apparatus at the wide angle end according to Embodiment 2 of the present invention. FIGS. 4A, 4B, and 4C are longitudinal aberration diagrams in the cases where the optical system used in the image pickup apparatus according to Embodiment 2 of the present invention focuses on an infinite distance object at the wide angle end, the middle zooming position, and the telephoto end, respectively.

Figure 7:
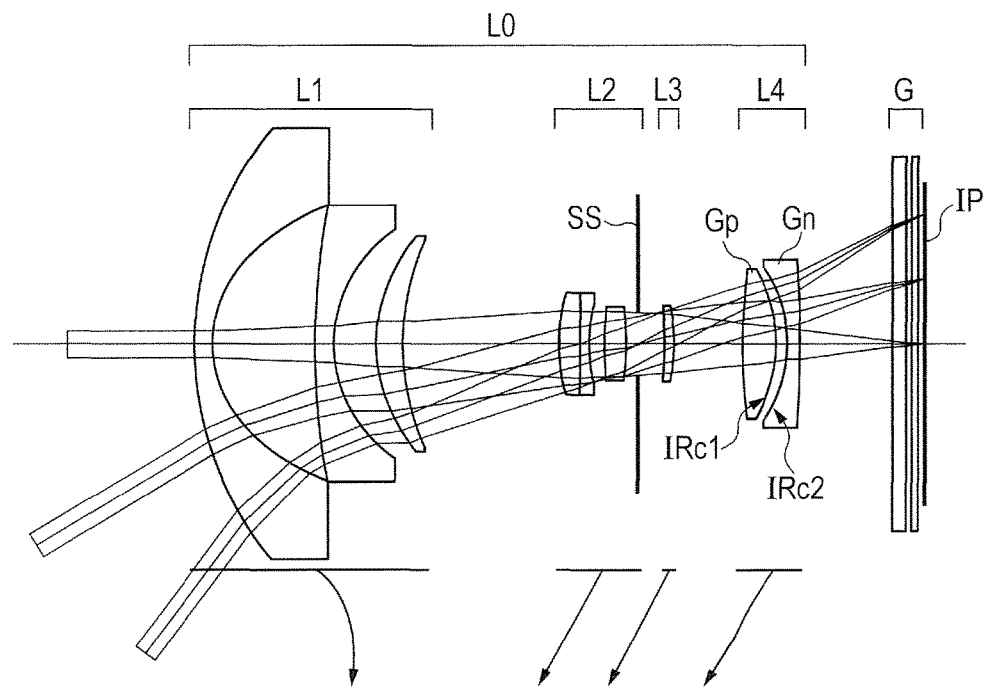
FIG. 7 is a lens cross sectional view of an optical system of Embodiment 4 at a wide angle end.
Figure 8A:
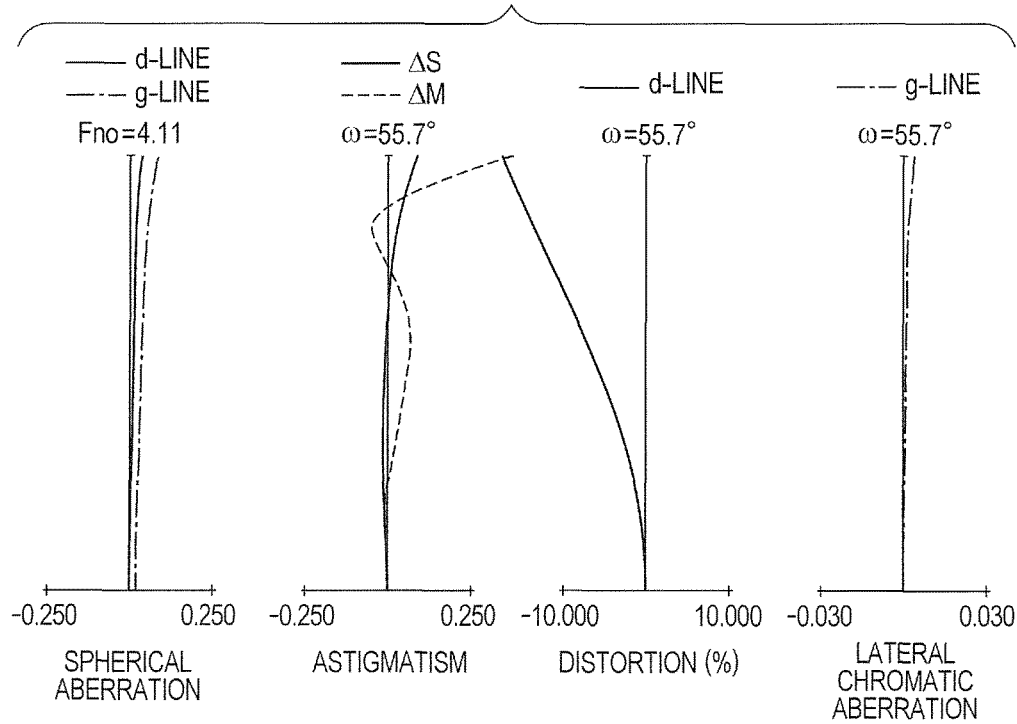
FIG. 8A is a longitudinal aberration diagram of the optical system of Embodiment 4 in infinity focusing at the wide angle end.

FIG. 5 is a lens cross sectional view of an optical system used in an image pickup apparatus at the wide angle end according to Embodiment 3 of the present invention. FIGS. 6A, 6B, and 6C are longitudinal aberration diagrams in the cases where the optical system used in the image pickup apparatus according to Embodiment 3 of the present invention focuses on an infinite distance object at the wide angle end, the middle zooming position, and the telephoto end, respectively. FIG. 7 is a lens cross sectional view of an optical system used in an image pickup apparatus at the wide angle end according to Embodiment 4 of the present invention. FIGS. 8A, 8B, and 8C are longitudinal aberration diagrams in the cases where the optical system used in the image pickup apparatus according to Embodiment 4 of the present invention focuses on an infinite distance object at the wide angle end, the middle zooming position, and the telephoto end, respectively.

Figure 9:
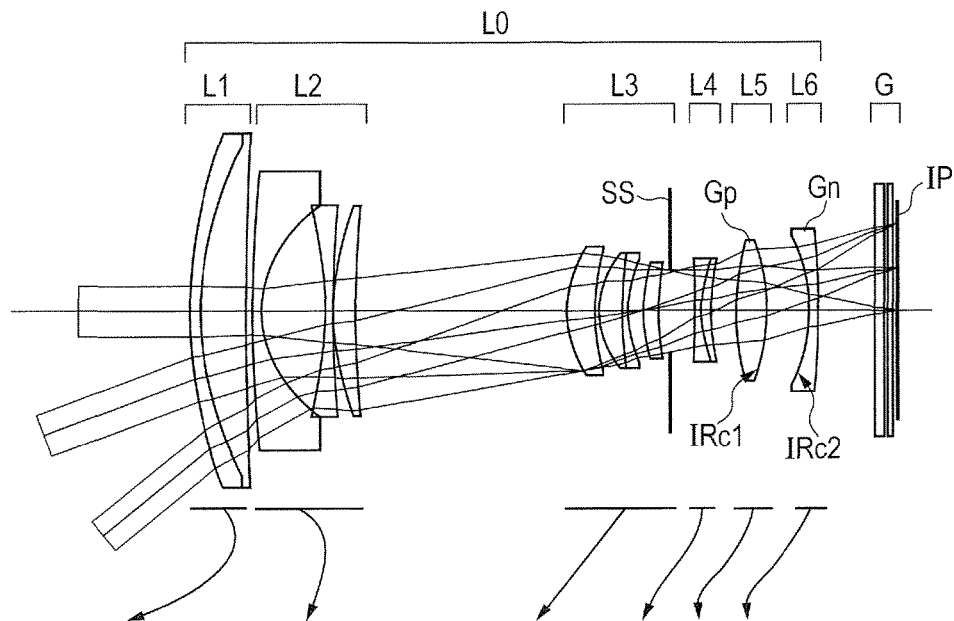
FIG. 9 is a lens cross sectional view of an optical system of Embodiment 5 at a wide angle end.
Figure 10A:
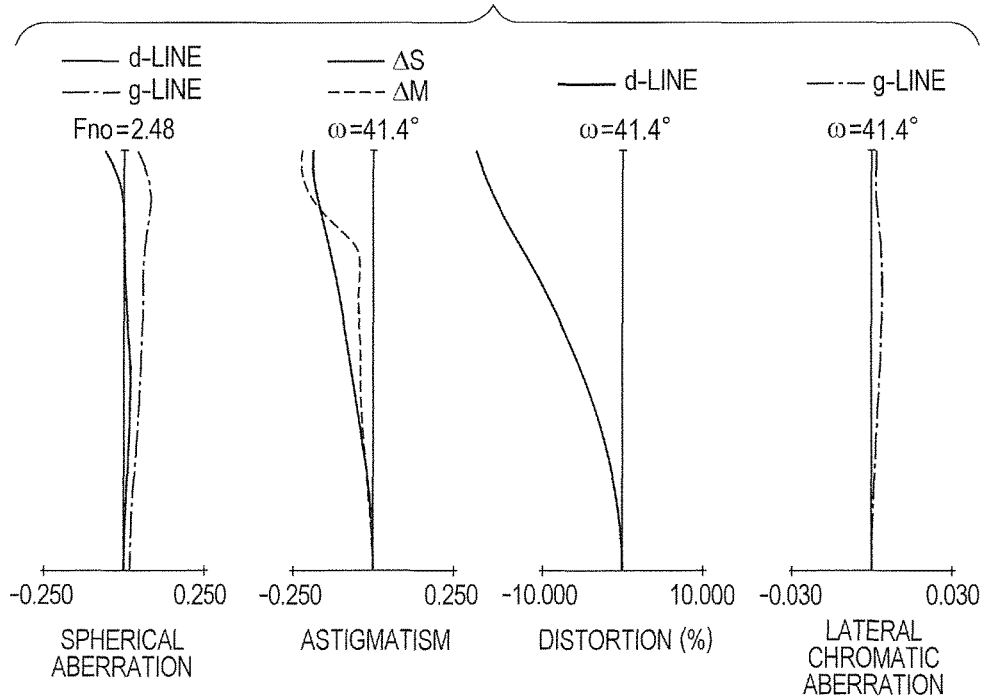
FIG. 10A is a longitudinal aberration diagram of the optical system of Embodiment 5 in infinity focusing at the wide angle end.
Figure 10B:
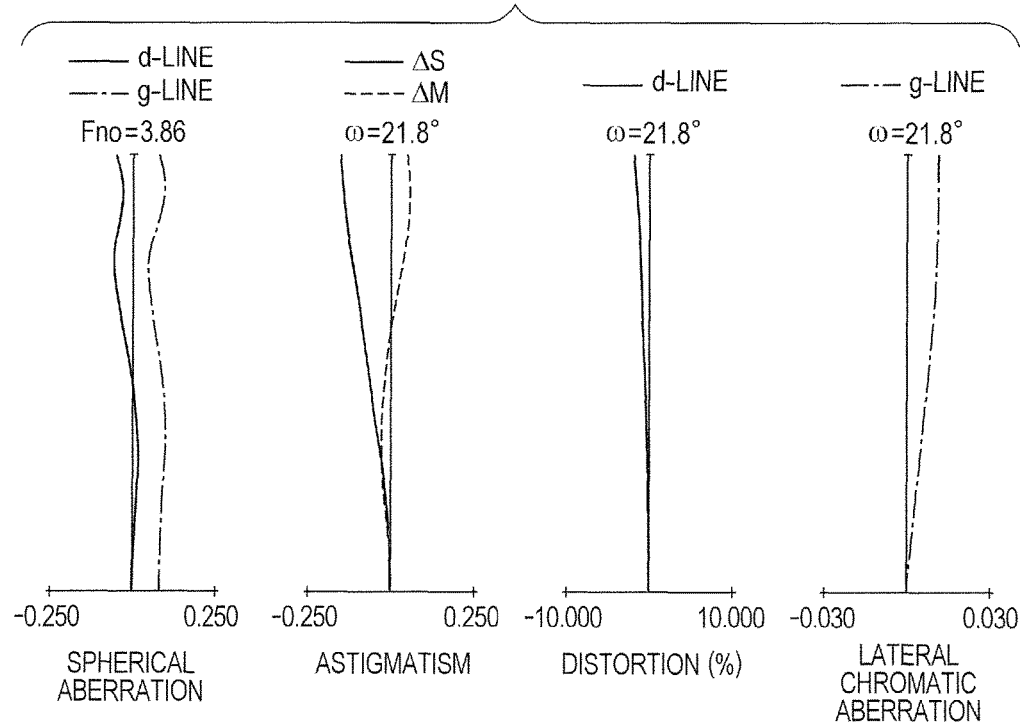
FIG. 10B is a longitudinal aberration diagram of the optical system of Embodiment 5 in infinity focusing at the middle zooming position.
Figure 10C:
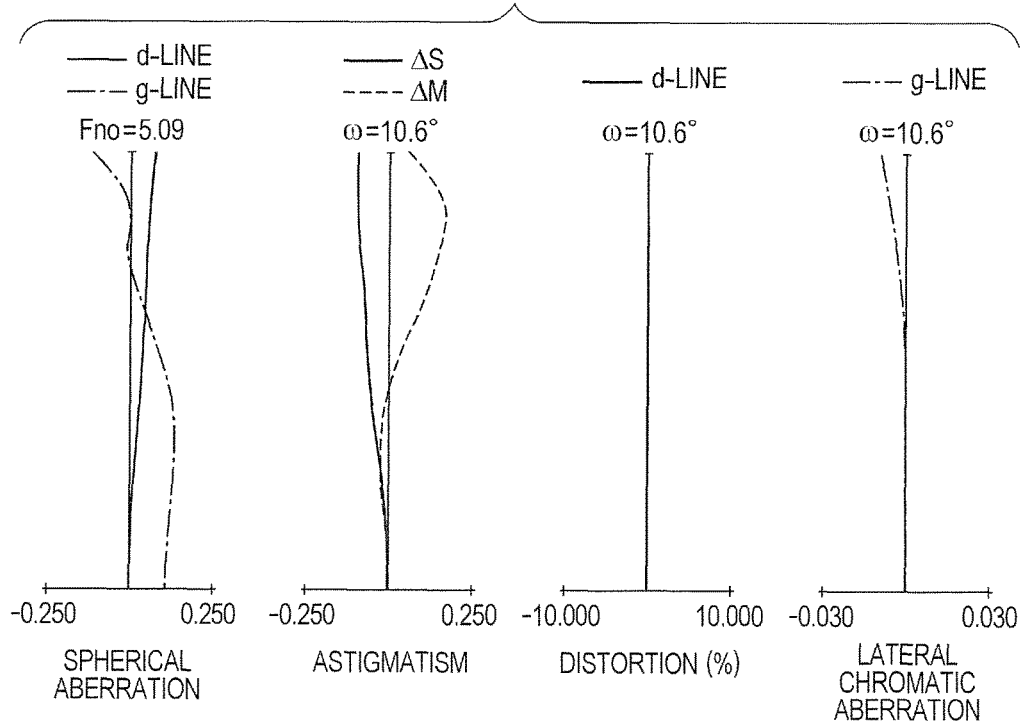
FIG. 10C is a longitudinal aberration diagram of the optical system of Embodiment 5 in infinity focusing at the telephoto end.
Figure 11:
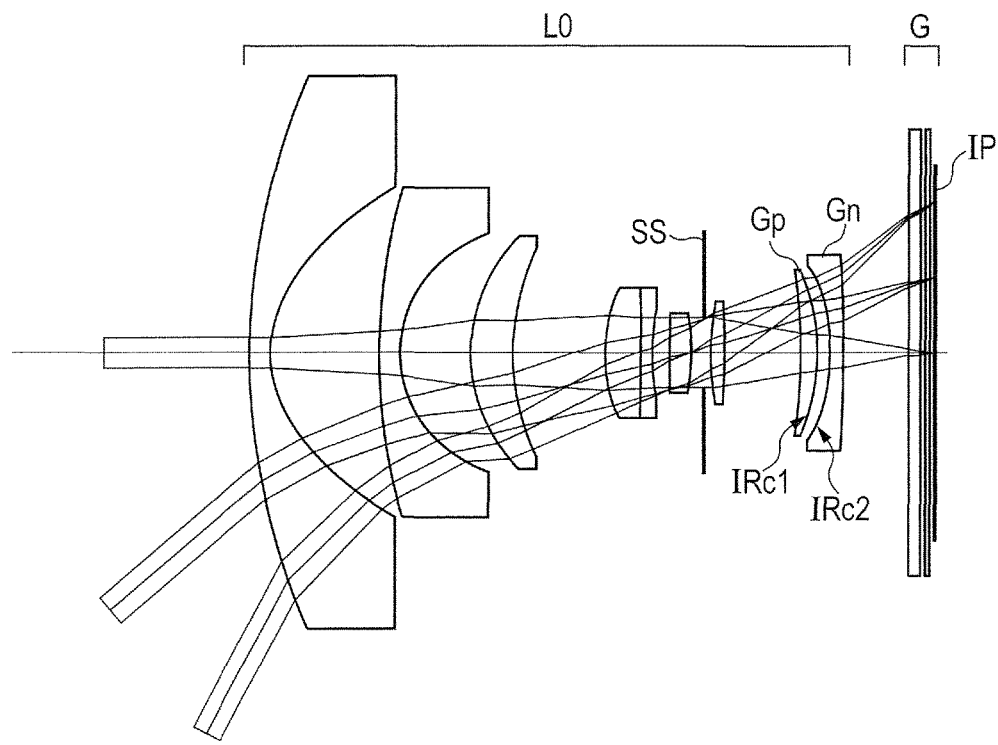
FIG. 11 is a lens cross sectional view of an optical system of Embodiment 6.
Figure 12:
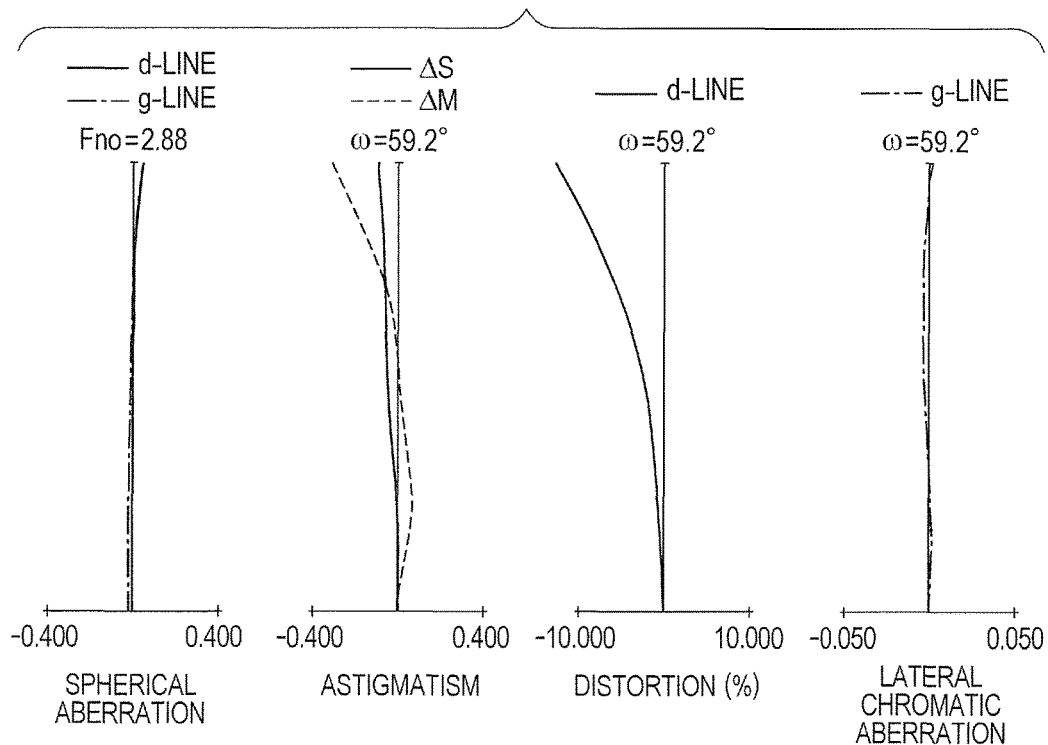
FIG. 12 is a longitudinal aberration diagram of the optical system of Embodiment 6 in infinity focusing.
Figure 13:
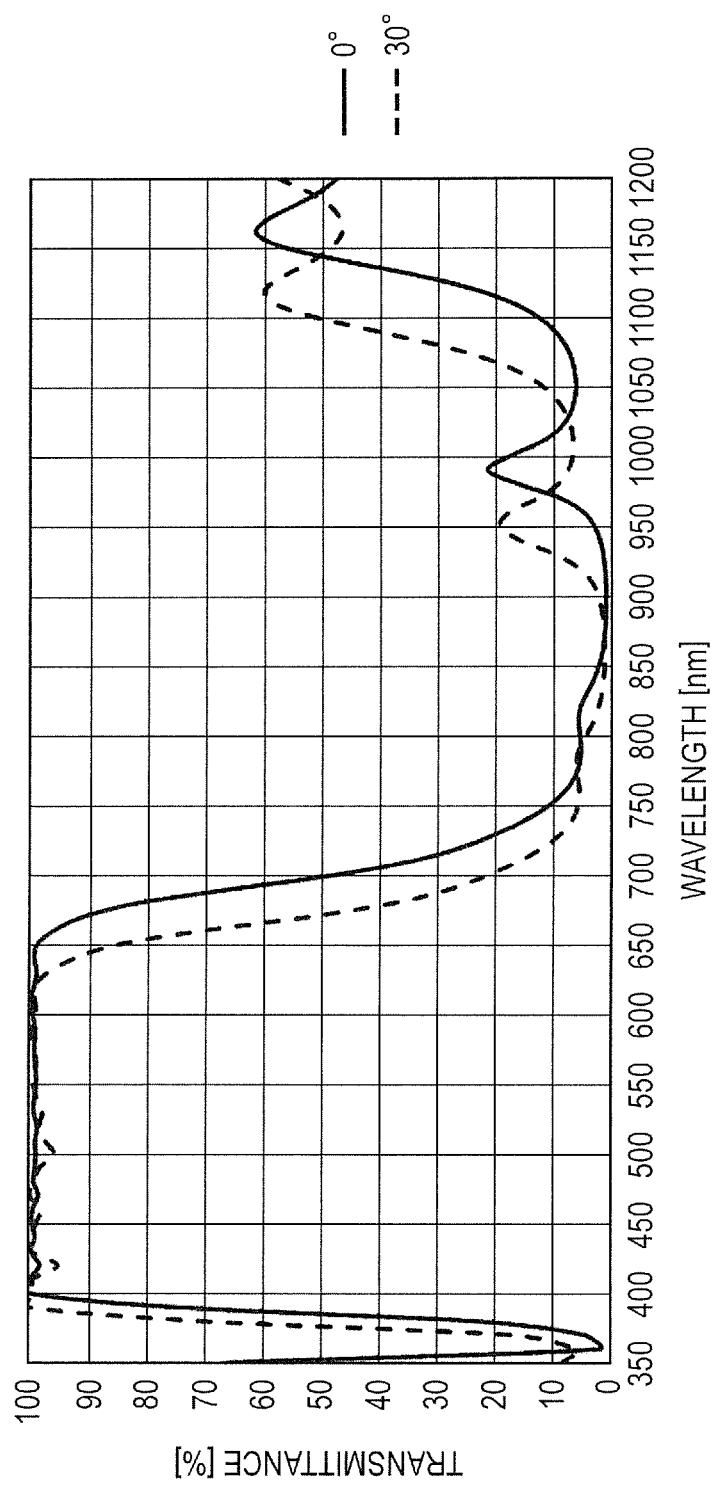
FIG. 13 is an explanatory diagram of film properties of an optical thin film disclosed in U.S. Pat. No. 7,411,729.

FIG. 9 is a lens cross sectional view of an optical system used in an image pickup apparatus at the wide angle end according to Embodiment 5 of the present invention. FIGS. 10A, 10B, and 10C are longitudinal aberration diagrams in the cases where the optical system used in the image pickup apparatus according to Embodiment 5 of the present invention focuses on an infinite distance object at the wide angle end, the middle zooming position, and the telephoto end, respectively. FIG. 11 is a lens cross sectional view of an optical system used in an image pickup apparatus at the wide angle end according to Embodiment 6 of the present invention. FIGS. 12A, 12B, and 12C are longitudinal aberration diagrams in the cases where the optical system used in the image pickup apparatus according to Embodiment 6 of the present invention focuses on an infinite distance object at the wide angle end, the middle zooming position, and the telephoto end, respectively.

The image pickup apparatuses of Embodiments 1 to 6 are cameras such as video cameras, digital still cameras, silver-halide film cameras, and television cameras. In the lens cross-sectional views of Embodiments 1 to 6, the left side is an object side (front side), and the right side is an image side (rear side). In the lens cross-sectional views, L0 is an optical system.

In the lens cross sectional views of FIGS. 1, 3, 5, 7, and 9, i indicates an order of the lens units from the object side, and Li indicates an i-th lens unit. In the lens cross-sectional views, SS is an aperture stop, and G is an optical block equivalent to an optical filter, a face plate, a low-pass filter, or the like. IP is an image plane. The image plane IP is equivalent to an image pickup plane of a solid state image pickup element (photoelectric conversion element) such as a CCD sensor or a CMOS sensor when the optical system is used in a video camera or a digital camera, and is equivalent to a film plane when the optical system is used in a silver-halide film camera.

The arrows associated with the lens units indicate movement loci of the respective lens units during zooming from the wide angle end to the telephoto end (magnification change). In the spherical aberration diagram, d is a d-line (a wavelength of 587.6 nm), and g is a g-line (a wavelength of 435.8 nm). In the astigmatism diagram, $\Delta S$ is a sagittal image plane of the d-line, and $\Delta M$ is a meridional image plane of the d-line. The distortion is presented in the case of the d-line. In the lateral chromatic aberration diagram, g is a g-line. Note that, when the optical systems described below are zoom lenses, the wide angle end and the telephoto end refer to zooming positions where the lens units during zooming are positioned, respectively, at one end and the other end of a mechanically movable range on the optical axis.

In the optical system L0 of Embodiments 1 to 6, Lepw denotes an optical axial distance from the exit pupil of the optical system L0 to the image plane when the optical system L0 focuses on an infinite distance object (a value at the wide angle end if the optical system L0 is a zoom lens); Lc denotes an optical axial distance from the lens surface provided with an infrared cut film to the image plane when the optical system L0 focuses on an infinite distance object (a value at the wide angle end if the optical system L0 is the zoom lens); Rc denotes a curvature radius of the lens surface provided with the infrared cut film; and Ymax denotes a radius of a circle circumscribed about an effective imaging area of the image pickup element.

The zoom lenses in Embodiments 1 to 6 satisfy the following conditional expressions:

$$0.1 < (Lepw - Lc)/Rc < 1.5 \quad (1); \text{ and}$$

$$1.0 < |Lepw|/Y\max < 2.5 \quad (2).$$

Here, if glass blocks such as an optical filter are inserted between the last lens surface and the image plane, both the optical axial distance from the exit pupil to the image plane and the optical axial distance from the lens surface provided with the infrared cut film to the image plane are distances in which the thicknesses of the glass blocks are converted to the lengths in air. In addition, the distance Lepw and the distance Lc are both expressed as positive values in a direction from the object side to the image side. Then, the infrared cut film may employ the film composition disclosed in, for example, U.S. Pat. No. 7,411,729.

Moreover, if the lens surface having the infrared cut film is aspherical, the curvature radius Rc of the lens surface having the infrared cut film is defined as the curvature radius of a reference sphere determined by a sag from the surface vertex on the optical axis to the end of the effective diameter.

The conditional expression (1) specifies an optical axial position of the lens surface provided with the infrared cut film in the optical system. When the infrared cut film is arranged on the lens surface satisfying the conditional expression (1), a view-angle dependent variation in the incident angle of the principal ray to the infrared cut film is reduced, and thereby color shading attributed to a shift of the cut-off frequency of the infrared cut film is reduced.

The lens surface provided with the infrared cut film has too small a curvature radius relative to the exit pupil position if the lens surface falls below the lower limit of the conditional expression (1). On the other hand, the lens surface provided with the infrared cut film has too large a curvature radius relative to the exit pupil position if the lens surface exceeds the upper limit of the conditional expression (1). Both the cases are undesirable because of an increase in a view-angle dependent variation of the incident angle of the principal ray with respect to the direction normal to the lens surface provided with the infrared cut film.

The conditional expression (2) specifies the incident angle of the principal ray to the image plane by using the distance from the exit pupil and the size of the image pickup element. By satisfying the conditional expression (2), the optical system can be made small and achieve a reduction in brightness shading. If the optical system falls below the lower limit of the conditional expression (2), the incident angle of the principal ray to the image plane is too large, and it becomes difficult to correct brightness shading attributed to a pixel structure of the image pickup element. On the other hand, if the optical system exceeds the upper limit of the conditional expression (2), the optical system is configured in an arrangement closer to the image space telecentric arrangement, so that the color shading problem is resolved. However, this case is also unfavorable because the optical system is increased in size if a large image pickup element is employed.

With the foregoing configuration, an image pickup apparatus is obtained in which the optical system is made small with a short pupil length structure and the occurrence of color shading due to an oblique incidence of the ray to the infrared cut film is reduced.

In Embodiments 1 to 6, it is more preferred to set the following numerical value ranges for the conditional expressions (1) and (2):

$$0.15 < (Lepw - Lc)/Rc < 1.30 \quad (1a); \text{ and}$$

$$1.05 < |Lepw|/Y\max < 2.00 \quad (2a).$$

In Embodiments 1 to 6, it is even more preferred to set the following numerical value ranges for the conditional expressions (1a) and (2a):

$$0.20 < (Lepw - Lc)/Rc < 1.15 \quad (1b); \text{ and}$$

$$1.1 < |Lepw|/Y\max < 1.8 \quad (2b).$$

In Embodiments 1 to 6, it is still further more preferred to satisfy at least one of the following conditional expressions. Here, fn denotes a focal length of the negative lens arranged at the most image side in the optical system L0; fw denotes a focal length of the total optical system (a value at the wide angle end if the optical system is a zoom lens); Rna denotes the curvature radius of the object-side lens surface of the negative lens arranged at the most image side in the optical system L0; and Rnb denotes the curvature radius of the image-side lens surface of the negative lens arranged at the most image side in the optical system L0.

Then, assuming that the optical system is a zoom lens in which the negative lens arranged at the most image side in the optical system L0 moves to the object side during zooming from the wide angle end to the telephoto end, $\beta nw$ denotes a lateral magnification of the negative lens arranged at the most image side in the optical system L0 in focusing on an infinite distance object at the wide angle end, and $\beta nt$ denotes the lateral magnification of the negative lens arranged at the most image side in the optical system L0 in focusing on the infinite distance object at the telephoto end. Under the foregoing definitions, the optical system preferably satisfies at least one of the following conditional expressions:

$$0.5 < |fn|/fw < 15.0 \quad (3);$$

$$0.5 < (Rnb + Rna)/(Rnb - Rna) < 5.0 \quad (4); \text{ and}$$

$$1.1 < \beta nt/\beta nw < 3.0 \quad (5).$$

Next, description will be provided for technical meanings of the above conditional expressions. The conditional expression (3) specifies a ratio of the focal length of the negative lens Gn arranged at the most image side in the optical system to the focal length of the total lens system (a value at the wide angle end if the optical system is the zoom lens). By optimizing the focal length of the negative lens Gn, the optical system can be made small, and obtain high optical properties. If the ratio falls below the lower limit of the conditional expression (3), the focal length of the negative lens Gn is so short that a curvature of field is increased in particular, and is difficult to correct. On the other hand, if the ratio exceeds the upper limit of the conditional expression (3), the focal length of the negative lens Gn is so long that a back focus is increased and accordingly the total lens length is increased.

The conditional expression (4) specifies a lens shape of the negative lens Gn arranged at the most image side in the optical system. By optimizing the lens shape of the negative lens Gn, the optical system can be made small and the exit pupil position is appropriately arranged. If the lens shape falls below the lower limit of the conditional expression (4), the image-side lens surface of the negative lens Gn generates too strong a negative power (optical power), the exit pupil position is too close to the image plane, and the incident angle of the ray onto the image plane is increased too much. On the other hand, if the lens shape exceeds the upper limit of the conditional expression (4), the image-side lens surface of the negative lens Gn generates too strong a positive power with the result that the total power generated by the negative lens Gn is too weak and the optical system is increased in total size.

In Embodiments 1 to 6, it is more preferred to employ the following numerical value ranges for the conditional expressions (3) and (4):

$$0.65 < |fn|/fw < 12.5 \quad \text{(3a); and}$$

$$0.6 < (Rnb+Rna)/(Rnb-Rna) < 4.0 \quad \text{(4a).}$$

In Embodiments 1 to 6, it is even more preferred to employ the following numerical value ranges for the conditional expressions (3a) and (4a):

$$0.8 < |fn|/fw < 10.0 \quad \text{(3b); and}$$

$$0.7 < (Rnb+Rna)/(Rnb-Rna) < 3.0 \quad \text{(4b).}$$

In Embodiments 1 to 5, zoom lenses are used as the optical systems. In addition, in Embodiments 1 to 5, the negative lens Gn arranged at the most image side moves from the image side to the object side during zooming from the wide angle end to the telephoto end. This configuration suppresses an increase in the effective lens diameter of the negative lens Gn and thereby facilities downsizing of the optical system. Moreover, the exit pupil moves to the object side during zooming from the wide angle end to the telephoto end. Here, in the case where the infrared cut film is provided to the negative lens Gn, the configuration in which the negative lens Gn simultaneously moves to the object side together with the exit pupil makes it possible to reduce a variation of the incident angle of the principal ray from the normal to the lens surface due to zooming and thereby effectively reduce a variation of color shading due to zooming.

The conditional expression (5) is applicable to the case where the optical system is the zoom lens. The conditional expression (5) specifies an image forming magnification of the negative lens Gn arranged at the most image side in the optical system. Provided with a magnifying effect, the negative lens Gn takes charge of part of the zooming effect of the total optical system, which facilitates the downsizing of the optical system. When falling below the lower limit of the conditional expression (5), the magnification change achievable by the negative lens Gn is too small. In this case, in order to design the optical system to achieve a certain zoom ratio, the optical system needs to be increased in size. On the other hand, when exceeding the upper limit of the conditional expression (5), the magnification change by the negative lens Gn is too large. This is disadvantageous in that it is difficult to correct variations in a curvature of field and a lateral chromatic aberration due to zooming.

It is more preferred to employ the following numerical value range for the conditional expression (5):

$$1.15 < \beta nt/\beta nw < 2.5 \quad \text{(5a).}$$

It is even more preferred to employ the following numerical value range for the conditional expression (5a):

$$1.2 < \beta nt/\beta nw < 2.0 \quad \text{(5b).}$$

Meanwhile, it is preferred to form an infrared cut film on a lens surface arranged on the image side of the aperture stop SS.

In Embodiments 1 to 6, the infrared cut film is formed on the object-side lens surface of the negative lens Gn arranged at the most image side. In other words, the object-side lens surface of the negative lens Gn is formed in a structure suitable for the infrared cut film such that an angle deviation of the principal ray at each angle of view from the normal to the lens surface is small. With this structure, the lens surface has a lens shape more concentric with the aperture stop SS and advantageously corrects a curvature of field while reducing the occurrence of color shading.

Also, in Embodiments 1 to 6, multiple infrared cut films are formed on multiple lens surfaces. With this configuration, the multiple lens surfaces collaborate with each other to produce the infrared light cut-off effect, which facilitates further enhancement of the infrared light cut-off effect of the total optical system. Moreover, in Embodiments 1 to 6, it is preferred that a glass block to act as an infrared absorption filter be provided between the optical system and the image pickup element. In general, if only an absorption type infrared cut film is set to highly cut the infrared light, the cut film also absorbs light in a visible range and disadvantageously reduces an imaging light volume.

In this regard, a combined use of the infrared cut film provided in the optical system with the absorption type infrared cut film makes it possible to sufficiently obtain both the imaging light volume and the infrared light cut-off effect in a well-balanced manner.

Next, with reference to the drawings, description is provided for lens configurations of the optical systems according to Embodiments 1 to 6 in the present invention.

Embodiment 1

FIG. 1 is a lens cross sectional view of the optical system L0 according to Embodiment 1 in the present invention. The optical system L0 of Embodiment 1 is a zoom lens. The zoom lens of Embodiment 1 is a three-unit zoom lens including, in order from the object side to the image side, first to third lens units L1 to L3 having negative, positive, and negative optical powers.

During zooming from the wide angle end to the telephoto end, the first lens unit L1 moves to the image side along a locus convex to the image side and thereby compensates for an image plane variation due to the zooming. Meanwhile, the second lens unit L2 and the third lens unit L3 perform zooming by moving to the object side while changing an interval between the lens units. The first lens unit L1 includes, in order from the object side to the image side, two meniscus negative lenses both having convex surfaces on the object side and a meniscus positive lens having a convex surface on the object side.

The second lens unit L2 includes, in order from the object side to the image side, a cemented lens in which a biconvex positive lens and a biconcave negative lens are joined together, a biconvex positive lens, an aperture stop SS, and a meniscus positive lens having a convex surface on the image side. The third lens unit L3 includes, in order from the object side to the image side, a biconvex positive lens Gp and a biconcave negative lens Gn. The negative lens Gn serves as the lens arranged at the most image side in the optical system L0. Here, an infrared cut film IRc1 is formed on the image-side lens surface (16th surface) of the positive lens Gp in the third lens unit L3, and an infrared cut film IRc2 is formed on the object-side lens surface (17th) of the negative lens Gn in the third lens unit L3.

Table 1 presents angles formed, on each of the lens surfaces provided with the infrared cut films (16th and 17th surfaces), by the principal rays at angles of view respectively corresponding to 0.4 and 0.8 of image height and the normal to the lens surface.

The occurrence of color shading is inhibited favorably by forming an infrared cut film on a lens surface on which an angle formed by the principal ray at each angle of view and the normal to the lens surface varies only to a small degree.

Embodiment 2

FIG. 3 is a lens cross sectional view of the optical system L0 according to Embodiment 2 in the present invention. The optical system L0 of Embodiment 2 is a zoom lens. The zoom lens of Embodiment 2 is the same as in Embodiment 1 in terms of the number of lens units, the positive/negative signs of the optical powers of the respective lens units, and a zoom type such as the movement conditions of the respective lens units for zooming. In Embodiment 2, the effective imaging area of the image pickup element is larger than in Embodiment 1, and the focal length range of the zooming range and the lens shapes of the lenses in the lens units are different from those in Embodiment 1.

The first lens unit L1 includes, in order from the object side to the image side, a meniscus negative lens having a convex surface on the object side, and a meniscus positive lens having a convex surface on the object side. The second lens unit L2 includes, in order from the object side to the image side, an aperture stop, two meniscus positive lenses each having a convex surface on the object side, a biconcave negative lens, and a biconvex positive lens. The third lens unit L3 includes, in order from the object side to the image side, a meniscus positive lens Gp having a convex surface on the image side and a meniscus negative lens Gn having a convex surface on the image side.

Here, an infrared cut film IRc1 is formed on the image-side lens surface (15th surface) of the positive lens Gp of the third lens unit L3, and an infrared cut film IRc2 is formed on the object-side lens surface (16th surface) of the negative lens Gn of the third lens unit L3. Table 2 presents angles formed, on each of the lens surfaces provided with the infrared cut films (15th and 16th surfaces), by the principal rays at angles of view respectively corresponding to 0.4 and 0.8 of image height and the normal to the lens surface, in the same manner as Table 1.

Embodiment 3

FIG. 5 is a lens cross sectional view of the optical system L0 according to Embodiment 3 in the present invention. The optical system L0 of Embodiment 3 is a zoom lens. The zoom lens of Embodiment 3 employs the same zoom type as Embodiment 1. In Embodiment 3, the effective imaging area of the image pickup element is larger than in Embodiment 1, and the focal length range in the zooming range and the lens shapes of the lenses in the lens units are different from those in Embodiment 1.

The first lens unit L1 has the same lens configuration as in Embodiment 1. The second lens unit L2 includes, in order from the object side to the image side, a cemented lens in which a biconvex positive lens and a biconcave negative lens are joined together, an aperture stop SS, and a meniscus positive lens having a convex surface on the image side. The third lens unit L3 includes, in order from the object side to the image side, a meniscus positive lens Gp having a convex surface on the image side and a meniscus negative lens Gn having a convex surface on the image side. The negative lens Gn serves as the lens arranged at the most image side in the optical system L0.

Here, an infrared cut film IRc1 is formed on the image-side lens surface (14th surface) of the positive lens Gp of the third lens unit L3, and an infrared cut film IRc2 is formed on the object-side lens surface (15th surface) of the negative lens Gn of the third lens unit L3. Table 3 presents angles formed, on each of the lens surfaces provided with the infrared cut films (14th and 15th surfaces), by the principal rays at angles of view respectively corresponding to 0.4 and 0.8 of image height and the normal to the lens surface, in the same manner as Table 1.

Embodiment 4

FIG. 7 is a lens cross sectional view of the optical system L0 according to Embodiment 4 in the present invention. The optical system L0 of Embodiment 4 is a zoom lens. The zoom lens of Embodiment 4 is a four-unit zoom lens including, in order from the object side to the image side, first to fourth lens units L1 to L4 having negative, positive, positive, and negative optical powers.

During zooming from the wide angle end to the telephoto end, the first lens unit L1 moves to the image side along a locus convex to the image side and thereby compensates for an image plane variation due to the zooming. Meanwhile, the second lens unit L2, the third lens unit L3, and the fourth lens unit L4 perform zooming by moving to the object side while changing intervals between the lens units.

The first lens unit L1 has the same lens configuration as in Embodiment 1. The second lens unit L2 includes, in order from the object side to the image side, a cemented lens in which a biconvex positive lens and a biconcave negative lens are joined together, a biconvex positive lens, and an aperture stop SS. The third lens unit L3 includes a meniscus positive lens having a convex surface on the image side. The fourth lens unit L4 includes, in order from the object side to the image side, a biconvex positive lens Gp and a meniscus negative lens Gn having a convex surface on the image side. The negative lens Gn serves as the lens arranged at the most image side in the optical system L0.

Here, an infrared cut film IRc1 is formed on the image-side lens surface (16th surface) of the positive lens Gp of the fourth lens unit L4, and an infrared cut film IRc2 is formed on the object-side lens surface (17th surface) of the negative lens Gn of the fourth lens unit L4. Table 4 presents angles formed, on each of the lens surfaces provided with the infrared cut films (16th and 17th surfaces), by the principal rays at angles of view respectively corresponding to 0.4 and 0.8 of image height and the normal to the lens surface, in the same manner as Table 1.

Embodiment 5

FIG. 9 is a lens cross sectional view of the optical system L0 according to Embodiment 5 in the present invention. The optical system L0 of Embodiment 5 is a zoom lens. The zoom lens of Embodiment 5 is a six-unit zoom lens including, in order from the object side to the image side, first to sixth lens units L1 to L6 having positive, negative, positive, negative, positive, and negative optical powers.

During zooming from the wide angle end to the telephoto end, the first lens unit L1 moves to the image side along a locus convex to the image side. The second lens unit L2 moves to the image side along a locus convex to the image side, and thereby performs zooming while compensating for an image plane variation due to the zooming. Meanwhile, the third lens unit L3, the fourth lens unit L4, the fifth lens unit L5, and the sixth lens unit L6 perform zooming by moving to the object side while changing intervals between the lens units.

The first lens unit L1 includes a cemented lens in which a meniscus negative lens having a convex surface on the object side and a meniscus positive lens having a convex surface on the object side are arranged in order from the object side to the image side, and are joined together. The second lens unit L2 includes, in order from the object side to the image side, a meniscus negative lens having a convex surface on the object side, a biconcave negative lens, and a meniscus positive lens having a convex surface on the object side.

The third lens unit L3 includes, in order from the object side to the image side, a meniscus positive lens having a convex surface on the object side, a cemented lens in which a meniscus positive lens having a convex surface on the object side and a meniscus negative lens having a convex surface on the object side are joined together, a meniscus positive lens having a convex surface on the object side, and an aperture stop SS. The fourth lens unit L4 includes a cemented lens in which a biconcave negative lens and a meniscus positive lens having a convex surface on the object side are arranged in order from the object side to the image side and are joined together. The fifth lens unit L5 includes a biconvex positive lens Gp. The sixth lens unit L6 includes a meniscus negative lens Gn having a convex surface on the image side.

Here, an infrared cut film IRc1 is formed on the image-side lens surface (22nd surface) of the positive lens Gp of the fifth lens unit L5, and an infrared cut film IRc2 is formed on the object-side lens surface (23rd surface) of the negative lens Gn of the sixth lens unit L6. Table 5 presents angles formed, on each of the lens surfaces provided with the infrared cut films (22nd and 23rd surfaces), by the principal rays at angles of view respectively corresponding to 0.4 and 0.8 of image height and the normal to the lens surface, in the same manner as Table 1.

Embodiment 6

FIG. 11 is a lens cross sectional view of the optical system L0 according to Embodiment 6 in the present invention. The optical system L0 of Embodiment 6 is a single focal length lens (fixed focal length lens). The optical system L0 of Embodiment 6 includes the following lens configuration in order from the object side to the image side.

The optical system L0 includes two meniscus negative lenses each having a convex surface on the object side, a meniscus positive lens having a convex surface on the object side, a cemented lens in which a biconvex positive lens and a biconcave negative lens are joined together, a meniscus positive lens having a convex surface on the image side, and an aperture stop SS. In addition, the optical system L0 includes a biconvex positive lens, a meniscus positive lens Gp having a convex surface on the image side, and a meniscus negative lens Gn having a convex surface on the image side. The negative lens Gn serves as the lens arranged at the most image side in the optical system L0.

Here, an infrared cut film IRc1 is formed on the image-side lens surface (16th surface) of the positive lens Gp arranged on the image side of the aperture stop SS, and an infrared cut film IRc2 is formed on the object-side lens surface (17th surface) of the negative lens Gn. Table 6 presents angles formed, on each of the lens surfaces provided with the infrared cut films (16th and 17th surfaces), by the principal rays at angles of view respectively corresponding to 0.4 and 0.8 of image height and the normal to the lens surface, in the same manner as Table 1.

In each of Embodiments, the image pickup apparatus includes the optical system L0 and the image pickup element. The optical system L0 includes, in order from the object side to the image side, one or more lenses, an aperture stop SS, and one or more lenses. The lens arranged at the most image side in the optical system L0 is the negative lens Gn. In addition, one or more infrared cut films are formed on one or more lens surfaces in the optical system L0. In this configuration, the optical system L0 satisfies both the conditional expression (1) and the conditional expression (2) at the same time. By satisfying them, the aforementioned configuration enables the realization of a small optical system having a short distance between the exit pupil position and the image plane, and a reduction in the occurrence of color shading due to an oblique incidence of a ray onto the infrared cut film(s).

Although the preferred embodiments of the present invention have been described heretofore, the present invention is not limited to these embodiments, but may be altered and modified in various ways without departing from the spirit of the present invention. For example, in order to correct image blurring due to shaking, it is possible to employ a mechanism to move the whole or a part of any of the lens units such that the lens unit can have a component vertical to the optical axis. Moreover, a remaining distortion that cannot be corrected by the optical system may be electrically corrected (corrected through image processing).

Next, numerical data 1 to 6 corresponding to Embodiments 1 to 6 will be presented. In the numerical data, i denotes the ordinal number of a surface counted from the object side, ri denotes the curvature radius of the i-th optical surface (the i-th surface), di denotes an on-axis distance between the i-th surface and the (i+1)-th surface, ndi and vdi denote a refractive power and an Abbe number, respectively, of the material for the optical component having the i-th surface based on the d-line. f denotes a focal length, Fno denotes an F-number and ω denotes a half angle of view.

BF denotes a back focus expressing a length in air from the last lens surface to the image plane. The total lens length is a sum of an optical axial distance from the first lens surface to the last lens surface and the back focus. Then, in the numerical data, an entrance pupil position and a front principal point position are both expressed by optical axial distances from the first lens surface. Then, an exit pupil position and a rear principal point position are both expressed by positions from the image plane where the thicknesses of the glass blocks are converted to the lengths in air.

Here, Nd denotes a refractive index based on the Fraunhofer d-line (a wavelength of 587.6 nm), NF denotes a refractive index based on the Fraunhofer F-line (a wavelength of 486.1 nm), and NC denotes a refractive index based on the Fraunhofer C-line (a wavelength of 656.3 nm). By using these definitions, the Abbe number of a material is expressed by the following formula:

$$\nu d = (Nd-1)/(NF-NC).$$

An aspherical shape is expressed by the following formula:

$$x = (h^2/R)/[1+\{1-(1+k)(h/R)^2\}^{1/2}] + A4 \times h^4 + A6 \times h^6 + A8 \times h^8 + A10 \times h^{10},$$

where a length in a light traveling direction is expressed as a positive length, x denotes a displacement from the surface vertex in the optical axis direction, h denotes a height from the optical axis in a direction vertical to the optical axis, r denotes a paraxial curvature radius, K denotes a conic constant, and A4, A6, A8 and A10 denotes aspheric coefficients.

Then, "e±xx" in numerical values indicates "x10±xx". Table 7 presents correspondences between numerical data and the foregoing conditional expressions.

[Numerical Embodiment 1]
[unit: mm]

Surface data

| Surface number i | ri | di | ndi | vdi | Effective diameter |
|---|---|---|---|---|---|
| 1 | 19.949 | 1.05 | 1.88300 | 40.8 | 25.50 |
| 2 | 10.763 | 5.98 | | | 19.50 |
| 3 | 46.361 | 1.05 | 1.76802 | 49.2 | 19.00 |
| 4* | 10.578 | 3.90 | | | 16.50 |
| 5 | 14.874 | 2.10 | 1.92286 | 20.9 | 16.50 |
| 6 | 25.169 | (variable) | | | 16.00 |
| 7* | 16.267 | 2.20 | 1.76802 | 49.2 | 6.80 |
| 8 | −23.843 | 0.55 | 1.69895 | 30.1 | 6.60 |
| 9 | 13.744 | 0.43 | | | 6.50 |
| 10 | 9.799 | 2.85 | 1.48749 | 70.2 | 6.60 |
| 11 | −17.901 | 0.45 | | | 6.50 |
| 12(stop) | ∞ | 1.00 | | | 6.08 |
| 13 | −11.545 | 0.70 | 1.48749 | 70.2 | 6.00 |
| 14 | −10.120 | (variable) | | | 6.00 |
| 15 | 29.438 | 2.10 | 1.55332 | 71.7 | 8.00 |
| 16* | −12.372 | 1.12 | | | 8.30 |
| 17 | −9.949 | 0.70 | 1.88300 | 40.8 | 8.30 |
| 18 | 100.203 | (variable) | | | 9.00 |
| 19 | ∞ | 1.20 | 1.51633 | 64.1 | 20.00 |
| 20 | ∞ | 0.50 | | | 20.00 |
| 21 | ∞ | 0.50 | 1.51633 | 64.1 | 20.00 |
| 22 | ∞ | 0.50 | | | 20.00 |
| Image plane | ∞ | | | | |

Aspheric surface data

4th surface

K = 0.00000e+000
A4 = −3.91779e−005
A6 = −6.70580e−007
A8 = 5.52378e−009
A10 = −1.10641e−010

7th surface

K = 0.00000e+000
4 = −1.58659e−004
A6 = −1.84867e−006
A8 = 1.44173e−008
A10 = −1.07018e−009

16th surface

K = −1.96729e+000
A4 = 2.53919e−004
A6 = 1.20722e−006
A8 = 1.35760e−007

Various data

Zoom ratio 2.65

| | Wide angle | Middle | Telephoto |
|---|---|---|---|
| Focal length | 6.90 | 12.62 | 18.26 |
| F-number | 2.90 | 4.32 | 5.76 |
| Half angle of view (deg) | 49.22 | 32.38 | 23.66 |
| Image height | 8.00 | 8.00 | 8.00 |
| Total lens length | 56.62 | 47.93 | 47.59 |
| BF | 6.75 | 11.34 | 16.08 |

-continued

[Numerical Embodiment 1]
[unit: mm]

| d6 | 18.85 | 5.64 | 0.77 |
|---|---|---|---|
| d14 | 4.85 | 4.78 | 4.57 |
| d18 | 4.63 | 9.22 | 13.96 |
| Entrance pupil position | 13.44 | 11.59 | 10.53 |
| Exit pupil position | −13.19 | −17.74 | −22.36 |
| Front principal point position | 16.73 | 15.24 | 13.87 |
| Rear principal point position | −6.90 | −12.62 | −18.26 |

Zoom lens unit data

| Unit | Start surface | Focal length | Lens structure length | Front principal point position | Rear principal point position |
|---|---|---|---|---|---|
| L1 | 1 | −15.97 | 14.08 | 2.58 | −9.66 |
| L2 | 7 | 13.36 | 8.18 | 2.49 | −3.91 |
| L3 | 15 | −38.50 | 3.92 | 6.83 | 3.40 |
| G | 19 | ∞ | 2.20 | 0.81 | −0.81 |

Single lens data

| Lens | Start surface | Focal length |
|---|---|---|
| G1 | 1 | −27.97 |
| G2 | 3 | −18.07 |
| G3 | 5 | 35.89 |
| G4 | 7 | 12.90 |
| G5 | 8 | −12.40 |
| G6 | 10 | 13.44 |
| G7 | 13 | 144.87 |
| G8 | 15 | 16.03 |
| G9(Gn) | 17 | −10.22 |
| G10 | 19 | 0.00 |
| G11 | 21 | 0.00 |

[Numerical Embodiment 2]
[unit: mm]

Surface data

| Surface number i | ri | di | ndi | vdi | Effective diameter |
|---|---|---|---|---|---|
| 1 | 387.771 | 2.00 | 1.85135 | 40.1 | 23.12 |
| 2* | 15.233 | 2.80 | | | 19.18 |
| 3 | 16.835 | 2.50 | 1.92286 | 20.9 | 19.07 |
| 4 | 26.188 | (variable) | | | 18.29 |
| 5(stop) | ∞ | 0.30 | | | 9.11 |
| 6* | 9.622 | 3.30 | 1.58313 | 59.4 | 9.50 |
| 7 | 34.395 | 0.40 | | | 8.74 |
| 8 | 17.167 | 1.90 | 1.60311 | 60.6 | 8.50 |
| 9 | 105.980 | 0.80 | | | 7.89 |
| 10 | −22.467 | 1.10 | 1.84666 | 23.8 | 7.63 |
| 11 | 54.827 | 0.80 | | | 7.41 |
| 12 | 54.827 | 1.70 | 1.55332 | 71.7 | 7.33 |
| 13* | −23.447 | (variable) | | | 7.23 |
| 14 | −27.978 | 2.00 | 1.80518 | 25.4 | 12.94 |
| 15 | −13.562 | 1.50 | | | 13.51 |
| 16 | −10.128 | 1.20 | 1.76802 | 49.2 | 13.63 |
| 17* | −49.739 | (variable) | | | 16.14 |
| 18 | ∞ | 1.20 | 1.51633 | 64.1 | 30.00 |
| 19 | ∞ | 0.50 | | | 30.00 |
| 20 | ∞ | 0.50 | 1.51633 | 64.1 | 30.00 |
| 21 | ∞ | 0.50 | | | 30.00 |
| Image plane | ∞ | | | | |

[Numerical Embodiment 2]
[unit: mm]

Aspheric surface data

2nd surface

K = −4.80469e−001
A4 = 2.12585e−005
A6 = 1.51789e−007
A8 = −7.73775e−010
A10 = 5.14417e−012

6th surface

K = −6.58806e−001
A4 = 1.05105e−004
A6 = 1.75844e−006
A8 = −7.89799e−009
A10 = 6.29525e−010

13th surface

K = 0.00000e+000
A4 = 3.15140e−004
A6 = 2.92427e−006
A8 = 9.05200e−008

17th surface

K = 0.00000e+000
A4 = −2.37683e−005
A6 = −1.56665e−007
A8 = 2.65842e−009
A10 = −3.47758e−011

Various data

Zoom ratio 2.86

| | Wide angle | Middle | Telephoto |
|---|---|---|---|
| Focal length | 18.10 | 35.51 | 51.80 |
| F-number | 3.67 | 5.32 | 7.00 |
| Half angle of view (deg) | 36.92 | 20.96 | 14.71 |
| Image height | 13.60 | 13.60 | 13.60 |
| Total lens length | 63.44 | 57.03 | 62.08 |
| BF | 11.10 | 21.21 | 31.96 |
| d4 | 22.95 | 6.53 | 1.55 |
| d13 | 7.09 | 7.00 | 6.26 |
| d17 | 8.98 | 19.09 | 29.84 |
| Entrance pupil position | 15.52 | 8.83 | 5.68 |
| Exit pupil position | −23.58 | −33.65 | −44.05 |
| Front principal point position | 19.72 | 6.86 | −3.42 |
| Rear principal point position | −18.10 | −35.51 | −51.80 |

Zoom lens unit data

| Unit | Start surface | Focal length | Lens structure length | Front principal point position | Rear principal point position |
|---|---|---|---|---|---|
| L1 | 1 | −32.61 | 7.30 | 0.64 | −4.42 |
| L2 | 5 | 18.10 | 10.30 | 0.68 | −7.07 |
| L3 | 14 | −37.81 | 4.70 | 2.80 | −0.44 |
| G | 18 | ∞ | 2.20 | 0.81 | −0.81 |

Single lens data

| Lens | Start surface | Focal length |
|---|---|---|
| G1 | 1 | −18.67 |
| G2 | 3 | 45.27 |
| G3 | 6 | 21.84 |
| G4 | 8 | 33.70 |
| G5 | 10 | −18.70 |
| G6 | 12 | 29.91 |
| G7 | 14 | 30.78 |
| G8(Gn) | 16 | −16.78 |
| G9 | 18 | 0.00 |
| G10 | 20 | 0.00 |

[Numerical Embodiment 3]
[unit: mm]

Surface data

| Surface number i | ri | di | ndi | vdi | Effective diameter |
|---|---|---|---|---|---|
| 1 | 23.655 | 1.50 | 1.81600 | 46.6 | 31.50 |
| 2 | 13.380 | 5.85 | | | 24.00 |
| 3 | 28.657 | 1.50 | 1.81000 | 41.0 | 23.50 |
| 4* | 10.440 | 4.21 | | | 19.00 |
| 5 | 13.448 | 3.50 | 1.92286 | 20.9 | 18.50 |
| 6 | 18.945 | (variable) | | | 17.00 |
| 7* | 20.125 | 2.90 | 1.81000 | 41.0 | 7.50 |
| 8 | −11.173 | 0.80 | 1.80518 | 25.4 | 6.40 |
| 9 | 89.402 | 1.20 | | | 5.60 |
| 10(stop) | ∞ | 1.12 | | | 5.53 |
| 11 | −130.308 | 1.90 | 1.55332 | 71.7 | 5.50 |
| 12 | −11.116 | (variable) | | | 6.30 |
| 13 | −22.517 | 1.95 | 1.48749 | 70.2 | 10.00 |
| 14 | −12.668 | 2.16 | | | 10.50 |
| 15* | −10.792 | 1.05 | 1.73077 | 40.5 | 11.50 |
| 16 | −25.626 | (variable) | | | 13.50 |
| 17 | ∞ | 1.20 | 1.51633 | 64.1 | 30.00 |
| 18 | ∞ | 0.50 | | | 30.00 |
| 19 | ∞ | 0.50 | 1.51633 | 64.1 | 30.00 |
| 20 | ∞ | 0.50 | | | 30.00 |
| Image plane | ∞ | | | | |

Aspheric surface data

4th surface

K = −6.41550e−001
A4 = 4.73916e−005
A6 = 1.62737e−007
A8 = 1.40008e−009
A10 = −1.87105e−012

7th surface

K = 0.00000e+000
A4 = −1.54189e−004
A6 = 1.13336e−006
A8 = −2.45846e−007
A10 = 5.69124e−009

15th surface

K = 1.24378e+000
A4 = −1.46625e−005
A6 = 3.23782e−006
A8 = −8.79992e−008
A10 = 2.01560e−009

Various data

Zoom ratio 1.90

| | Wide angle | Middle | Telephoto |
|---|---|---|---|
| Focal length | 11.33 | 16.52 | 21.57 |
| F-number | 4.12 | 4.95 | 5.78 |
| Half angle of view (deg) | 50.20 | 39.47 | 32.23 |
| Image height | 13.60 | 13.60 | 13.60 |
| Total lens length | 58.93 | 54.45 | 54.11 |

[Numerical Embodiment 3]
[unit: mm]

|  |  |  |  |
|---|---|---|---|
| BF | 8.66 | 12.77 | 17.02 |
| d6 | 13.32 | 4.99 | 0.80 |
| d12 | 7.30 | 7.05 | 6.65 |
| d16 | 6.54 | 10.65 | 14.90 |
| Entrance pupil position | 15.83 | 13.80 | 12.40 |
| Exit pupil position | −19.95 | −23.89 | −27.89 |
| Front principal point position | 20.72 | 18.90 | 17.29 |
| Rear principal point position | −11.33 | −16.52 | −21.57 |

Zoom lens unit data

| Unit | Start surface | Focal length | Lens structure length | Front principal point position | Rear principal point position |
|---|---|---|---|---|---|
| L1 | 1 | −20.47 | 16.56 | 4.49 | −8.37 |
| L2 | 7 | 14.50 | 7.92 | 3.57 | −2.80 |
| L3 | 13 | −49.96 | 5.16 | 3.05 | −0.97 |
| G | 17 | ∞ | 2.20 | 0.81 | −0.81 |

Single lens data

| Lens | Start surface | Focal length |
|---|---|---|
| G1 | 1 | −40.40 |
| G2 | 3 | −21.05 |
| G3 | 5 | 38.47 |
| G4 | 7 | 9.25 |
| G5 | 8 | −12.29 |
| G6 | 11 | 21.84 |
| G7 | 13 | 55.79 |
| G8(Gn) | 15 | −26.30 |
| G9 | 17 | 0.00 |
| G10 | 19 | 0.00 |

[Numerical Embodiment 4]
[unit: mm]

Surface data

| Surface number i | ri | di | ndi | vdi | Effective diameter |
|---|---|---|---|---|---|
| 1 | 28.993 | 1.50 | 1.58313 | 59.4 | 35.00 |
| 2* | 10.130 | 8.52 |  |  | 23.00 |
| 3 | 75.017 | 1.50 | 1.69680 | 55.5 | 22.00 |
| 4 | 11.612 | 3.53 |  |  | 18.00 |
| 5 | 14.259 | 2.10 | 2.00069 | 25.5 | 17.00 |
| 6 | 21.828 | (variable) |  |  | 16.50 |
| 7* | 14.812 | 1.80 | 1.85135 | 40.1 | 7.90 |
| 8 | −74.045 | 0.80 | 1.80809 | 22.8 | 7.10 |
| 9 | 18.318 | 1.19 |  |  | 6.50 |
| 10 | 30.969 | 1.80 | 1.55332 | 71.7 | 5.70 |
| 11 | −23.879 | 1.05 |  |  | 5.40 |
| 12(stop) | ∞ | (variable) |  |  | 5.21 |
| 13 | −17.411 | 0.75 | 1.55332 | 71.7 | 5.30 |
| 14* | −11.449 | (variable) |  |  | 5.80 |
| 15 | 58.460 | 2.75 | 1.49700 | 81.5 | 11.00 |
| 16 | −12.409 | 0.92 |  |  | 11.50 |
| 17* | −12.930 | 1.05 | 1.85135 | 40.1 | 12.00 |
| 18 | −112.172 | (variable) |  |  | 13.00 |
| 19 | ∞ | 1.20 | 1.51633 | 64.1 | 30.00 |
| 20 | ∞ | 0.50 |  |  | 30.00 |
| 21 | ∞ | 0.50 | 1.51633 | 64.1 | 30.00 |
| 22 | ∞ | 0.50 |  |  | 30.00 |
| Image plane | ∞ |  |  |  |  |

Aspheric surface data

2nd surface

K = −3.88288e−001
A4 = 4.21397e−006
A6 = 1.85880e−007
A8 = −1.39950e−009
A10 = 1.16682e−011

7th surface

K = 0.00000e+000
A4 = −9.92045e−005
A6 = 8.97045e−007
A8 = −1.17947e−007
A10 = 2.90064e−009

14th surface

K = 0.00000e+000
A4 = 4.67652e−005
A6 = 1.12889e−007

17th surface

K = −1.40851e+000
A4 = −1.99054e−004
A6 = −8.02251e−007
A8 = 3.30134e−009
A10 = −2.72115e−010

Various data

Zoom ratio 1.91

|  | Wide angle | Middle | Telephoto |
|---|---|---|---|
| Focal length | 9.27 | 13.52 | 17.70 |
| F-number | 4.11 | 4.94 | 5.76 |
| Half angle of view (deg) | 55.72 | 45.16 | 37.53 |
| Image height | 13.60 | 13.60 | 13.60 |
| Total lens length | 59.89 | 55.85 | 55.76 |
| BF | 9.69 | 14.13 | 18.74 |
| d6 | 13.04 | 4.94 | 0.80 |
| d12 | 2.25 | 2.55 | 2.85 |
| d14 | 5.66 | 4.98 | 4.12 |
| d18 | 7.57 | 12.01 | 16.62 |
| Entrance pupil position | 14.24 | 13.02 | 12.17 |
| Exit pupil position | −19.78 | −23.96 | −28.18 |
| Front principal point position | 19.17 | 18.91 | 18.75 |
| Rear principal point position | −9.27 | −13.52 | −17.70 |

Zoom lens unit data

| Unit | Start surface | Focal length | Lens structure length | Front principal point position | Rear principal point position |
|---|---|---|---|---|---|
| L1 | 1 | −16.23 | 17.14 | 3.74 | −10.72 |
| L2 | 7 | 18.71 | 6.64 | 1.41 | −3.69 |
| L3 | 13 | 57.83 | 0.75 | 1.35 | 0.89 |
| L4 | 15 | −147.14 | 4.72 | 11.51 | 7.60 |
| G | 19 | ∞ | 2.20 | 0.81 | −0.81 |

Single lens data

| Lens | Start surface | Focal length |
|---|---|---|
| G1 | 1 | −27.51 |
| G2 | 3 | −19.91 |
| G3 | 5 | 36.08 |

[Numerical Embodiment 4]
[unit: mm]

| | | |
|---|---|---|
| G4 | 7 | 14.63 |
| G5 | 8 | −18.10 |
| G6 | 10 | 24.66 |
| G7 | 13 | 57.83 |
| G8 | 15 | 20.86 |
| G9(Gn) | 17 | −17.25 |
| G10 | 19 | 0.00 |
| G11 | 21 | 0.00 |

[Numerical Embodiment 5]
[unit: mm]

Surface data

| Surface number i | ri | di | ndi | vdi | Effective diameter |
|---|---|---|---|---|---|
| 1 | 60.618 | 1.40 | 1.92286 | 18.9 | 43.00 |
| 2 | 44.589 | 5.60 | 1.77250 | 49.6 | 40.00 |
| 3 | 348.313 | (variable) | | | 38.50 |
| 4 | 182.095 | 1.10 | 1.83481 | 42.7 | 33.50 |
| 5 | 15.581 | 7.85 | | | 25.00 |
| 6 | −45.701 | 0.90 | 1.72916 | 54.7 | 25.00 |
| 7 | 125.993 | 0.10 | | | 25.00 |
| 8 | 35.330 | 2.80 | 1.95906 | 17.5 | 25.00 |
| 9 | 148.050 | (variable) | | | 24.50 |
| 10* | 14.728 | 3.50 | 1.74330 | 49.3 | 14.80 |
| 11* | 28.062 | 0.47 | | | 14.00 |
| 12 | 10.873 | 3.00 | 1.49700 | 81.5 | 13.50 |
| 13 | 60.677 | 0.60 | 1.84666 | 23.8 | 12.80 |
| 14 | 15.166 | 1.92 | | | 11.80 |
| 15 | 18.861 | 2.00 | 1.55332 | 71.7 | 11.30 |
| 16* | 110.482 | 1.40 | | | 10.60 |
| 17(stop) | ∞ | (variable) | | | 10.16 |
| 18* | −394.854 | 0.80 | 1.85135 | 40.1 | 11.00 |
| 19 | 17.895 | 1.20 | 1.80809 | 22.8 | 11.70 |
| 20 | 29.636 | (variable) | | | 12.00 |
| 21 | 32.931 | 3.80 | 1.69680 | 55.5 | 16.20 |
| 22 | −23.845 | (variable) | | | 16.50 |
| 23 | −21.112 | 1.20 | 1.85135 | 40.1 | 17.50 |
| 24* | −118.987 | (variable) | | | 19.00 |
| 25 | ∞ | 1.20 | 1.51633 | 64.1 | 30.00 |
| 26 | ∞ | 0.50 | | | 30.00 |
| 27 | ∞ | 0.50 | 1.51633 | 64.1 | 30.00 |
| 28 | ∞ | 0.50 | | | 30.00 |
| Image plane | ∞ | | | | |

Aspheric surface data

10th surface

K = 0.00000e+000
A4 = 2.66711e−005
A6 = −9.13915e−008
A8 = 3.40042e−010

11th surface

K = 0.00000e+000
A4 = 3.71950e−005
A6 = −4.77987e−007

16th surface

K = 0.00000e+000
A4 = 1.86746e−004
A6 = 1.60647e−006
A8 = 2.38978e−008

18th surface

K = 0.00000e+000
A4 = −3.87605e−005
A6 = 3.91886e−007
A8 = −2.34568e−009

24th surface

K = 0.00000e+000
A4 = −2.36640e−005
A6 = 1.74635e−007
A8 = −1.81120e−009
A10 = 9.12312e−012

Various data

Zoom ratio 4.71

| | Wide angle | Middle | Telephoto |
|---|---|---|---|
| Focal length | 15.45 | 33.94 | 72.80 |
| F-number | 2.48 | 3.86 | 5.09 |
| Half angle of view (deg) | 41.36 | 21.84 | 10.58 |
| Image height | 13.60 | 13.60 | 13.60 |
| Total lens length | 87.43 | 86.90 | 113.34 |
| BF | 9.12 | 18.63 | 26.12 |
| d3 | 0.85 | 6.52 | 29.28 |
| d9 | 26.42 | 8.48 | 0.40 |
| d17 | 3.00 | 7.89 | 10.84 |
| d20 | 3.14 | 2.50 | 4.56 |
| d22 | 5.26 | 3.25 | 2.50 |
| d24 | 7.00 | 16.51 | 24.00 |
| Entrance pupil position | 25.60 | 32.18 | 84.79 |
| Exit pupil position | −21.81 | −33.79 | −46.40 |
| Front principal point position | 30.11 | 32.03 | 43.36 |
| Rear principal point position | −15.45 | −33.94 | −72.80 |

Zoom lens unit data

| Unit | Start surface | Focal length | Lens structure length | Front principal point position | Rear principal point position |
|---|---|---|---|---|---|
| L1 | 1 | 102.25 | 7.00 | −1.13 | −4.97 |
| L2 | 4 | −20.00 | 12.75 | 0.78 | −9.67 |
| L3 | 10 | 21.08 | 12.88 | −0.26 | −9.74 |
| L4 | 18 | −31.30 | 2.00 | 0.97 | −0.12 |
| L5 | 21 | 20.41 | 3.80 | 1.34 | −0.97 |
| L6 | 23 | −30.32 | 1.20 | −0.14 | −0.79 |
| G | 25 | ∞ | 2.20 | 0.81 | −0.81 |

Single lens data

| Lens | Start surface | Focal length |
|---|---|---|
| G1 | 1 | −190.71 |
| G2 | 2 | 65.67 |
| G3 | 4 | −20.47 |
| G4 | 6 | −45.89 |
| G5 | 8 | 47.80 |
| G6 | 10 | 37.50 |
| G7 | 12 | 26.13 |
| G8 | 13 | −24.03 |
| G9 | 15 | 40.79 |
| G10 | 18 | −20.09 |
| G11 | 19 | 53.46 |
| G12 | 21 | 20.41 |
| G13(Gn) | 23 | −30.32 |
| G14 | 25 | 0.00 |
| G15 | 27 | 0.00 |

[Numerical Embodiment 6]
[unit: mm]

Surface data

| Surface number i | ri | di | ndi | vdi | Effective diameter |
|---|---|---|---|---|---|
| 1 | 79.416 | 2.35 | 1.58313 | 59.4 | 62.00 |
| 2* | 14.047 | 12.56 | | | 37.50 |
| 3 | 67.650 | 2.35 | 1.59522 | 67.7 | 36.50 |
| 4 | 14.208 | 8.09 | | | 26.00 |
| 5 | 18.520 | 5.05 | 2.00069 | 25.5 | 25.50 |
| 6 | 28.878 | 10.48 | | | 23.00 |
| 7* | 15.666 | 4.20 | 1.73077 | 40.5 | 14.00 |
| 8 | −184.044 | 1.25 | 1.92286 | 18.9 | 11.50 |
| 9 | 23.221 | 2.00 | | | 10.00 |
| 10 | −213.499 | 2.50 | 1.48749 | 70.2 | 8.50 |
| 11 | −24.009 | 1.65 | | | 8.50 |
| 12(stop) | ∞ | 0.55 | | | 8.25 |
| 13 | 22.907 | 1.65 | 1.55332 | 71.7 | 10.00 |
| 14* | −79.667 | 8.89 | | | 10.50 |
| 15 | −57.566 | 1.95 | 1.49700 | 81.5 | 17.50 |
| 16 | −23.283 | 1.34 | | | 18.00 |
| 17* | −46.878 | 1.65 | 1.73077 | 40.5 | 18.50 |
| 18 | −132.459 | 7.57 | | | 21.50 |
| 19 | ∞ | 1.20 | 1.51633 | 64.1 | 50.00 |
| 20 | ∞ | 0.50 | | | 50.00 |
| 21 | ∞ | 0.50 | 1.51633 | 64.1 | 50.00 |
| 22 | ∞ | 0.50 | | | 50.00 |
| Image plane | ∞ | | | | |

Aspheric surface data

2nd surface

K = −1.05763e+000
A4 = 1.96033e−005
A6 = −3.54949e−008
A8 = 1.76153e−010
A10 = −2.66654e−013

7th surface

K = 0.00000e+000
A4 = −4.77795e−005
A6 = −4.38578e−008
A8 = −7.30949e−009
A10 = 7.79123e−011

14th surface

K = 0.00000e+000
A4 = 2.78219e−006
A6 = −1.68836e−007

17th surface

K = 5.18925e+000
A4 = −1.16909e−004
A6 = −3.75379e−007
A8 = 2.42550e−009
A10 = −3.45395e−011

Various data

| | |
|---|---|
| Focal length | 10.30 |
| F-number | 2.88 |
| Half angle of view (deg) | 64.55 |
| Image height | 21.64 |
| Total lens length | 78.20 |
| BF | 9.69 |
| Entrance pupil position | 18.25 |
| Exit pupil position | −24.31 |
| Front principal point position | 24.19 |
| Rear principal point position | −10.30 |

-continued

[Numerical Embodiment 6]
[unit: mm]

Zoom lens unit data

| Unit | Start surface | Focal length | Lens structure length | Front principal point position | Rear principal point position |
|---|---|---|---|---|---|
| L | 1 | 10.30 | 68.51 | 24.19 | −0.61 |
| G | 19 | ∞ | 2.20 | 0.81 | −0.81 |

Single lens data

| Lens | Start surface | Focal length |
|---|---|---|
| G1 | 1 | −29.66 |
| G2 | 3 | −30.72 |
| G3 | 5 | 41.48 |
| G4 | 7 | 19.93 |
| G5 | 8 | −22.28 |
| G6 | 10 | 55.25 |
| G7 | 13 | 32.34 |
| G8 | 15 | 77.21 |
| G9(Gn) | 17 | −100.10 |
| G10 | 19 | 0.00 |
| G11 | 21 | 0.00 |

TABLE 1

| Numerical Embodiment 1 | | Field | Angle of normal to hit point of principal ray [deg] | Principal ray angle [deg] | Angle between normal and principal ray [deg] |
|---|---|---|---|---|---|
| 16th surface | wide | 0.4 | 5.67 | 4.96 | −0.71 |
| | | 0.8 | 10.76 | 9.18 | −1.58 |
| | tele | 0.4 | 2.95 | 3.47 | 0.52 |
| | | 0.8 | 5.89 | 6.61 | 0.72 |
| 17th surface | wide | 0.4 | 9.03 | 4.05 | −4.98 |
| | | 0.8 | 17.21 | 8.11 | −9.10 |
| | tele | 0.4 | 4.84 | 3.42 | −1.42 |
| | | 0.8 | 9.62 | 6.48 | −3.14 |

TABLE 2

| Numerical Embodiment 2 | | Field | Angle of normal to hit point of principal ray [deg] | Principal ray angle [deg] | Angle between normal and principal ray [deg] |
|---|---|---|---|---|---|
| 15th surface | wide | 0.4 | 9.75 | 7.48 | −2.27 |
| | | 0.8 | 18.75 | 14.38 | −4.37 |
| | tele | 0.4 | 4.53 | 3.96 | −0.57 |
| | | 0.8 | 9.08 | 7.79 | −1.29 |
| 16th surface | wide | 0.4 | 13.91 | 5.65 | −8.26 |
| | | 0.8 | 26.86 | 10.84 | −16.02 |
| | tele | 0.4 | 6.59 | 3.50 | −3.09 |
| | | 0.8 | 13.16 | 6.75 | −6.41 |

TABLE 3

| Numerical Embodiment 3 | | Field | Angle of normal to hit point of principal ray [deg] | Principal ray angle [deg] | Angle between normal and principal ray [deg] |
|---|---|---|---|---|---|
| 14th surface | wide | 0.4 | 11.00 | 9.76 | −1.24 |
| | | 0.8 | 19.93 | 18.11 | −1.82 |
| | tele | 0.4 | 7.44 | 7.14 | −0.30 |
| | | 0.8 | 14.30 | 13.51 | −0.79 |

TABLE 3-continued

| Numerical Embodiment 3 | | Field | Angle of normal to hit point of principal ray [deg] | Principal ray angle [deg] | Angle between normal and principal ray [deg] |
|---|---|---|---|---|---|
| 15th surface | wide | 0.4 | 16.06 | 9.16 | −6.90 |
| | | 0.8 | 29.21 | 17.22 | −11.99 |
| | tele | 0.4 | 11.03 | 6.99 | −4.04 |
| | | 0.8 | 21.14 | 13.13 | −8.01 |

TABLE 4

| Numerical Embodiment 4 | | Field | Angle of normal to hit point of principal ray [deg] | Principal ray angle [deg] | Angle between normal and principal ray [deg] |
|---|---|---|---|---|---|
| 16th surface | wide | 0.4 | 11.40 | 8.11 | −3.29 |
| | | 0.8 | 21.31 | 14.51 | −6.80 |
| | tele | 0.4 | 7.17 | 6.07 | −1.10 |
| | | 0.8 | 13.87 | 11.42 | −2.45 |
| 17th surface | wide | 0.4 | 12.70 | 6.47 | −6.23 |
| | | 0.8 | 23.71 | 11.11 | −12.60 |
| | tele | 0.4 | 8.10 | 5.53 | −2.57 |
| | | 0.8 | 15.65 | 10.19 | −5.46 |

TABLE 5

| Numerical Embodiment 5 | | Field | Angle of normal to hit point of principal ray [deg] | Principal ray angle [deg] | Angle between normal and principal ray [deg] |
|---|---|---|---|---|---|
| 22th surface | wide | 0.4 | 6.50 | 6.35 | −0.15 |
| | | 0.8 | 12.99 | 12.33 | −0.66 |
| | tele | 0.4 | 5.48 | 3.48 | −2.00 |
| | | 0.8 | 11.11 | 6.93 | −4.18 |
| 23th surface | wide | 0.4 | 8.89 | 6.24 | −2.65 |
| | | 0.8 | 17.61 | 11.88 | −5.73 |
| | tele | 0.4 | 6.44 | 2.08 | −4.36 |
| | | 0.8 | 13.04 | 4.00 | −9.04 |

TABLE 6

| Numerical Embodiment 6 | Field | Angle of normal to hit point of principal ray [deg] | Principal ray angle [deg] | Angle between normal and principal ray [deg] |
|---|---|---|---|---|
| 16th surface | 0.4 | 10.86 | 13.28 | 2.42 |
| | 0.8 | 18.15 | 21.39 | 3.24 |
| 17th surface | 0.4 | 12.82 | 14.48 | 1.66 |
| | 0.8 | 21.32 | 23.00 | 1.68 |

TABLE 7

| Conditional Expression | Lower limit | Upper limit | Embodiment 1 | | Embodiment 2 | | Embodiment 3 | |
|---|---|---|---|---|---|---|---|---|
| (1) | 0.1 | 1.5 | 16th surface | 0.308 | 15th surface | 0.721 | 14th surface | 0.637 |
| | | | 17th surface | 0.577 | 16th surface | 1.114 | 15th surface | 1.032 |
| (2) | 1.0 | 2.5 | 1.648 | | 1.734 | | 1.467 | |
| (3) | 0.5 | 15.0 | 5.579 | | 0.927 | | 2.321 | |
| (4) | 0.5 | 5.0 | 0.819 | | 1.511 | | 2.455 | |
| (5) | 1.1 | 3.0 | 1.539 | | 1.726 | | 1.232 | |
| Conditional Expression | Lower limit | Upper limit | Embodiment 4 | | Embodiment 5 | | Embodiment 6 | |
| (1) | 0.1 | 1.5 | 16th surface | 0.655 | 22th surface | 0.261 | 16th surface | 0.499 |
| | | | 17th surface | 0.778 | 23th surface | 0.544 | 17th surface | 0.604 |
| (2) | 1.0 | 2.5 | 1.455 | | 1.604 | | 1.124 | |
| (3) | 0.5 | 15.0 | 1.861 | | 1.962 | | 9.720 | |
| (4) | 0.5 | 5.0 | 1.261 | | 1.431 | | 2.096 | |
| (5) | 1.1 | 3.0 | 1.328 | | 1.423 | | | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-079394, filed Apr. 12, 2016, which is hereby incorporated by reference herein in its entirety.

What is claimed is:
1. An image pickup apparatus comprising:
an optical system; and
an image pickup element configured to pick up an image formed by the optical system, wherein the optical system includes, in order from an object side to an image side, one or more lenses, an aperture stop, and one or more lenses, the lens arranged at the most image side in the optical system is a negative lens, an infrared cut film is formed on at least one lens surface in the optical system, and the following conditional expressions are satisfied:

$$0.1 < (Lepw - Lc)/Rc < 1.5; \text{ and}$$

$$1.0 < |Lepw|/Y\max < 2.5,$$

where Lepw denotes an optical axial distance from an exit pupil of the optical system to an image plane when the optical system focuses on an infinite distance object, Lc denotes an optical axial distance from the lens surface provided with the infrared cut film to the image plane when the optical system focuses on the infinite distance object, Rc denotes a curvature radius of the lens surface provided with the infrared cut film, and Ymax denotes a radius of a circle circumscribed about an effective imaging area of the image pickup element.

2. The image pickup apparatus according to claim 1, wherein the infrared cut film is formed on a lens surface arranged on the image side of the aperture stop.

3. The image pickup apparatus according to claim 1, wherein the following conditional expression is satisfied, $$0.5 < |fn|/fw < 15.0$$

where fn denotes a focal length of the negative lens arranged at the most image side in the optical system, and fw denotes a focal length of the optical system.

4. The image pickup apparatus according to claim 1, wherein the following conditional expression is satisfied, $$0.5 < (Rnb + Rna)/(Rnb - Rna) < 5.0,$$

where Rna denotes a curvature radius of an object-side lens surface of the negative lens arranged at the most image side in the optical system, and Rnb denotes a curvature radius of the image-side lens surface of the negative lens.

5. The image pickup apparatus according to claim 1, wherein the infrared cut film is formed on an object-side lens surface of the negative lens arranged at the most image side in the optical system.

6. The image pickup apparatus according to claim 1, wherein the infrared cut films are formed on a plurality of lens surfaces.

7. The image pickup apparatus according to claim 1, wherein an infrared absorption filter is provided between the optical system and the image pickup element.

8. The image pickup apparatus according to claim 1, wherein the optical system is a zoom lens.

9. The image pickup apparatus according to claim 8, wherein the negative lens arranged at the most image side in the optical system moves to the object side during zooming from a wide angle end to a telephoto end.

10. The image pickup apparatus according to claim 8, wherein the following conditional expression is satisfied, $$1.1 < \beta nt/\beta nw < 3.0,$$

where βnw denotes a lateral magnification of the negative lens arranged at the most image side in the optical system when the optical system focuses on the infinite distance object at the wide angle end, and βnt denotes the lateral magnification of the negative lens arranged at the most image side in the optical system when the optical system focuses on the infinite distance object at the telephoto end.

* * * * *